United States Patent [19]

Sisemore

[11] Patent Number: 5,780,994
[45] Date of Patent: Jul. 14, 1998

[54] DETECTION OF INFLECTION POINT IN SECONDARY-BATTERY CHARGING PROCESS BY MATCHING VOLTAGE RESPONSE TO FIRST DERIVATIVE OF BATTERY'S CHARACTERISTIC CURVE

[75] Inventor: Christopher S. Sisemore, Tucson, Ariz.

[73] Assignee: Securaplane Technologies, L.L.C., Tucson, Ariz.

[21] Appl. No.: 823,324

[22] Filed: Mar. 21, 1997

[51] Int. Cl.$^6$ .................................................. H01M 10/44
[52] U.S. Cl. ............................................. 320/156; 320/148
[58] Field of Search .................................. 320/20, 30, 37, 320/38, 39, 47, 155, 156, 148

[56] References Cited

U.S. PATENT DOCUMENTS

| | | | |
|---|---|---|---|
| 4,503,378 | 3/1985 | Jones et al. | 320/20 |
| 4,677,363 | 6/1987 | Kopmann | 320/44 |
| 5,432,426 | 7/1995 | Yoshida | 320/20 |
| 5,477,125 | 12/1995 | Ettel et al. | 320/20 |
| 5,600,226 | 2/1997 | Falcon | 320/20 |

*Primary Examiner*—Peter S. Wong
*Assistant Examiner*—Gregory J. Toatley, Jr.
*Attorney, Agent, or Firm*—Antonio R. Durando

[57] ABSTRACT

A secondary battery charging method that utilizes a standard, characteristic reference curve for that type of battery for identifying the voltage inflection point during a constant-current charging process. The voltage response of a battery being charged is sampled periodically and compared to the reference curve to establish the degree of completion of battery charge by tracking the reference curve. The charging stage of the battery is determined as the fast-charge operation progresses by identifying a place on the reference curve corresponding to the observed response. When a satisfactory match is found, the time remaining to reach a fast-charge termination point is predicted by assuming that the voltage response will track the reference curve to the inflection point. Accordingly, the voltage response is no longer monitored and the time remaining to reach the inflection point is used to complete the fast-charge operation. For the purpose of developing the reference curve, the functionality of the derivative of the standard voltage-versus-time response for the system is simulated by assuming an exponential relation during the early stages of fast-charge and a sinc function relation as the battery approaches the voltage inflection point indicating optimal termination of the fast-charge process.

20 Claims, 16 Drawing Sheets

DETECTION OF INFLECTION POINT IN SECONDARY-BATTERY CHARGING PROCESS BY MATCHING VOLTAGE RESPONSE TO FIRST DERIVATIVE OF BATTERY'S CHARACTERISTIC CURVE

BACKGROUND OF THE INVENTION

1. Field of the Invention

This invention pertains in general to the field of battery chargers. In particular, the invention consists of a novel approach for detecting the voltage-response inflection point during the process of constant-current charging of secondary batteries.

2. Description of the Related Art

A common practice followed in recharging partially depleted secondary batteries is the fast-charge process, which consists of a combination of charging modes utilized at different stages of the operation. A high current rate, typically defined as a factor of the rated capacity of the battery being charged, is used to deliver the majority of the charge during a relatively short period of time, followed by a small trickle rate to maintain the charge. This approach has the advantage of rapidly charging the battery, but it must be carefully controlled to avoid overcharging the battery because it can produce overheating which, in turn, can cause loss of electrolyte and/or cell damage. Therefore, appropriate charging methods and controls are critical to the life and reliability of secondary batteries.

It is known that the terminal voltage of secondary batteries increases according to a well understood characteristic curve during a constant-current charging process regardless of the initial charge stage. See, for example, curve 10 in FIG. 1, which represents a typical voltage-versus-time response of a nickel-cadmium battery under fast charge at a constant current equal to the battery's rated capacity. After an initial rapid rise to a nominal level (not shown in curve 10), the terminal voltage continues to rise at a substantially constant, relatively-low rate as charge is accepted by the battery; then it rises at a progressively faster rate and, as the battery approaches full charge, the rate of rise begins to decrease. When a battery under constant charging current is near full charge, the terminal voltage exhibits an inflection point such as illustrated by reference numeral 12 in FIG. 1. Obviously, the inflection point 12 corresponds to a local maximum 14 in the corresponding first-order derivative curve 16, also illustrated in the figure.

The inflection point 12 and the derivative's maximum 14 of the voltage-versus-time response of a battery under constant current charge provide a commonly-used indication that the battery is close to being charged to capacity. Therefore, accurate and reliable detection of the inflection point is critical for avoiding overcharge during the high-rate charging mode and consequently also for maximizing the life and reliability of secondary batteries. Based on this principle, several prior-art approaches have been developed to facilitate the identification of the inflection point and near full-charge condition during the charging process.

For example, U.S. Pat. No. 5,477,125 to Ettel et al. discloses a battery charging system where two inflection points on the terminal voltage-versus-time curve are identified by calculating the first derivative of the curve. The second derivative is also utilized to identify the inflection point corresponding to full charge and other significant points in the charging process. Rolling averages of load-free voltage samples are used during the entire charging process to filter out the effects of voltage fluctuations.

U.S. Pat. No. 4,503,378 to Jones et al. discloses a charging system for nickel-zinc batteries where the inflection point is also determined by analyzing the derivative of the terminal voltage as a function of time. Charging is interrupted when the derivative reaches a maximum.

U.S. Pat. No. 4,677,363 to Kopmann describes a nickel-cadmium battery charging system where the terminal voltage is monitored to determine the state of charge of the battery. The voltage behavior near the inflection point is identified by calculating first or higher order derivatives of the voltage curve.

Finally, U.S. Pat. No. 5,432,426 to Yoshida discloses a system where the charging process continues past the inflection point and is terminated only when the terminal voltage reaches a maximum level. The first derivative of the voltage curve is used to identify the last charging stage, which includes the inflection point, when the battery approaches its maximum charge.

All of these techniques utilize voltage, current and sometimes temperature data to correlate the state of charge of the secondary battery to a standard reference voltage curve. They all utilize, directly or indirectly, first-order derivative information to identify reference points, including the final inflection point, corresponding to a near full-charge condition. The techniques require continuous monitoring of terminal voltage during the entire charging process.

One problem with these prior-art methods for recognizing the voltage inflection point of secondary batteries is the fact that they are very sensitive to voltage variations caused by variable loads and transient and wide-band noise, such as encountered in aircraft power system under normal operating conditions. As a result, these methods commonly fail to detect the inflection point of the terminal voltage response curve during the charging process and erroneously undercharge or overcharge the battery. In order to correct this deficiency, other variables, such as current and temperature, are often also monitored during charging and the additional information is utilized to refine the process. This approach introduces hardware and software complications that often outweigh its benefits. Accordingly, there still is a need for a simple, more accurate approach for recognizing the voltage inflection point of a secondary battery being fast-charged under constant current regardless of transient loads and other variables operating on the system during the recharging process.

BRIEF SUMMARY OF THE INVENTION

One primary goal of this invention is an approach for the detection of the inflection point in the terminal voltage-versus-time curve of a secondary battery under constant-current, fast charge that is insensitive to extraneous system loads applied to the battery.

Another important objective is an approach that enables the recharging of a secondary battery at high constant current until near full charge is achieved with a high degree of certainty that overcharging will not occur.

Another goal is an optimal method of detecting near full charge of a secondary battery being charged at high current so that charge time is minimized.

Still another goal is an approach of general application, so that it can be implemented in equivalent fashion with a variety of secondary batteries, such as nickel-cadmium, lead-acid and nickel-zinc batteries.

Finally, another objective is an approach that is suitable for implementation with existing hardware and instrumentation utilized in conventional fast-charging equipment.

Therefore, according to these and other objectives, one aspect of the present invention consists of utilizing a standard, characteristic reference curve (standard for the type of battery of interest), developed by fitting empirical data of voltage-versus-time behavior for that type of battery while charged at a constant-current rate, in order to identify the voltage inflection point during the charging process. The voltage response of a battery being charged at the same constant-current rate is sampled periodically and compared to the reference curve to establish the degree of completion of battery charge by tracking the reference curve. The charging stage of the battery is determined as the fast-charge operation progresses by identifying a place on the reference curve corresponding to the observed response. When a satisfactory match is found, the time remaining to reach termination of fast charge is predicted by assuming that the voltage response will track the reference curve to the inflection point. Accordingly, the voltage response is no longer monitored and the time remaining to reach the inflection point on the reference curve is used to complete the operation.

According to another aspect of the invention, normalized time derivatives of the terminal voltage data are used, rather than the voltage itself, to determine the position on the reference curve corresponding to the observed voltage response. By comparing a plurality of consecutive normalized derivative values obtained from the sampled voltage data with derivative values calculated from the reference curve, the process of matching the observed behavior with the reference curve is rendered substantially insensitive to voltage spikes and other transient phenomena that might otherwise produce erroneous matches. A rolling set of measured normalized derivatives is successively compared to normalized slope values of the reference curve as the charging operation progresses until a match is found within a predetermined tolerance. When such a match is identified, the time remaining to reach the inflection point on the reference curve is calculated and set to complete the fast-charge operation without further sampling of voltage data.

According to yet another aspect of the invention, the functionality of the derivative of the voltage-versus-time reference curve for the system is simulated by assuming an exponential relation during the early stages of charge and a sinc function relation as the battery approaches fast-charge termination. This combination of curves produces a composite functionality well suited for fitting the voltage derivative response of various conventional secondary batteries by variation of reference curve scaling parameters. In addition, an analog composite function allows for infinite resolution of the reference curve.

Finally, another aspect of the invention is based on the recognition that the voltage behavior of a secondary battery being charged at a given rate follows substantially the same characteristic reference curve to the inflection point regardless of its initial charge condition, temperature and other operating variables. In practice, the only variation produced by these different conditions between batteries is the rate at which the characteristic voltage trajectory is followed. Accordingly, when sampled voltage data collected during charge do not yield derivative values that readily match the corresponding reference slope curve, the sampling rate is adjusted to produce a matching trend that normalizes the measured voltage derivative of the charging process and allows ready estimation of the time remaining to full charge.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

Figure 5A:
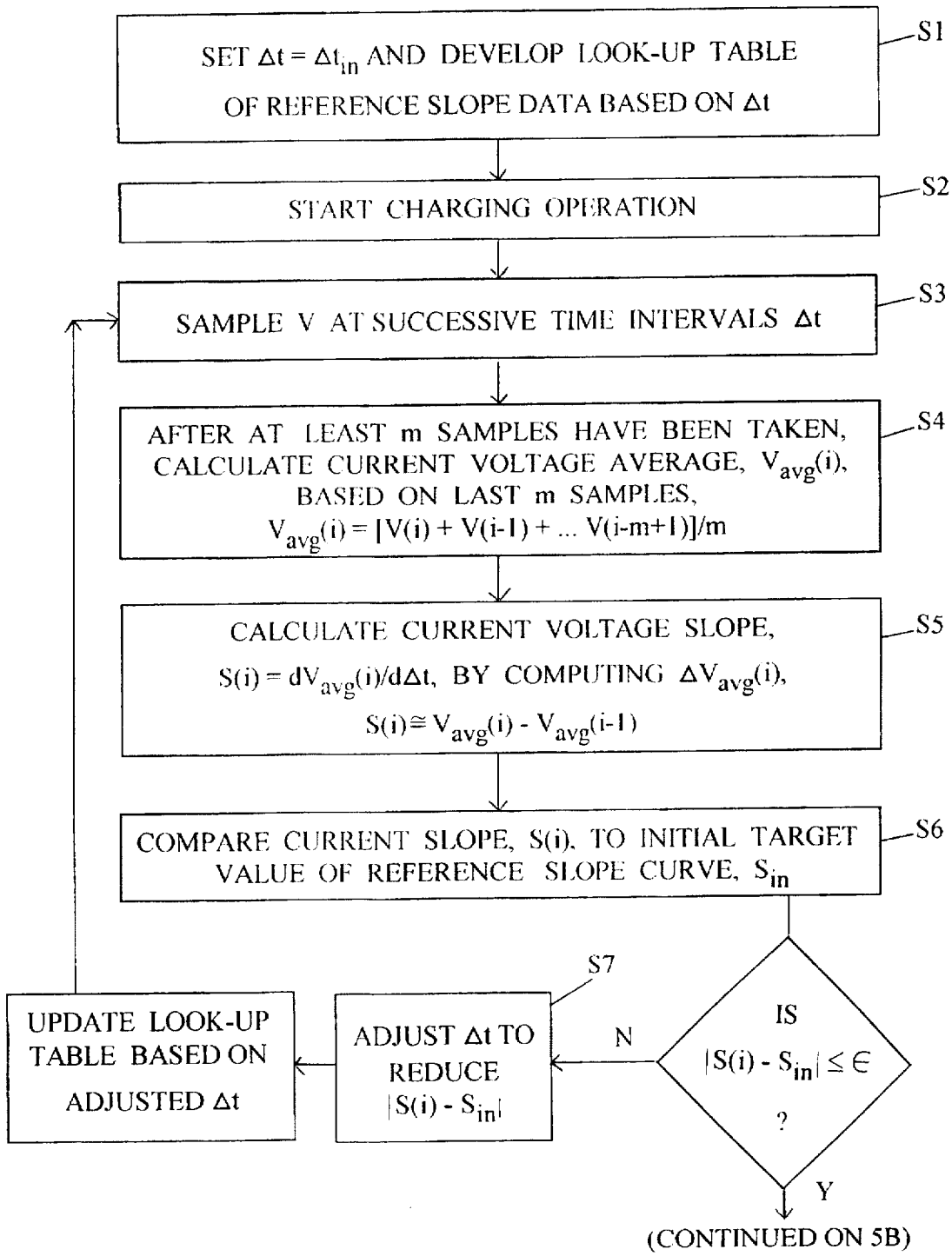
Figure 5B:
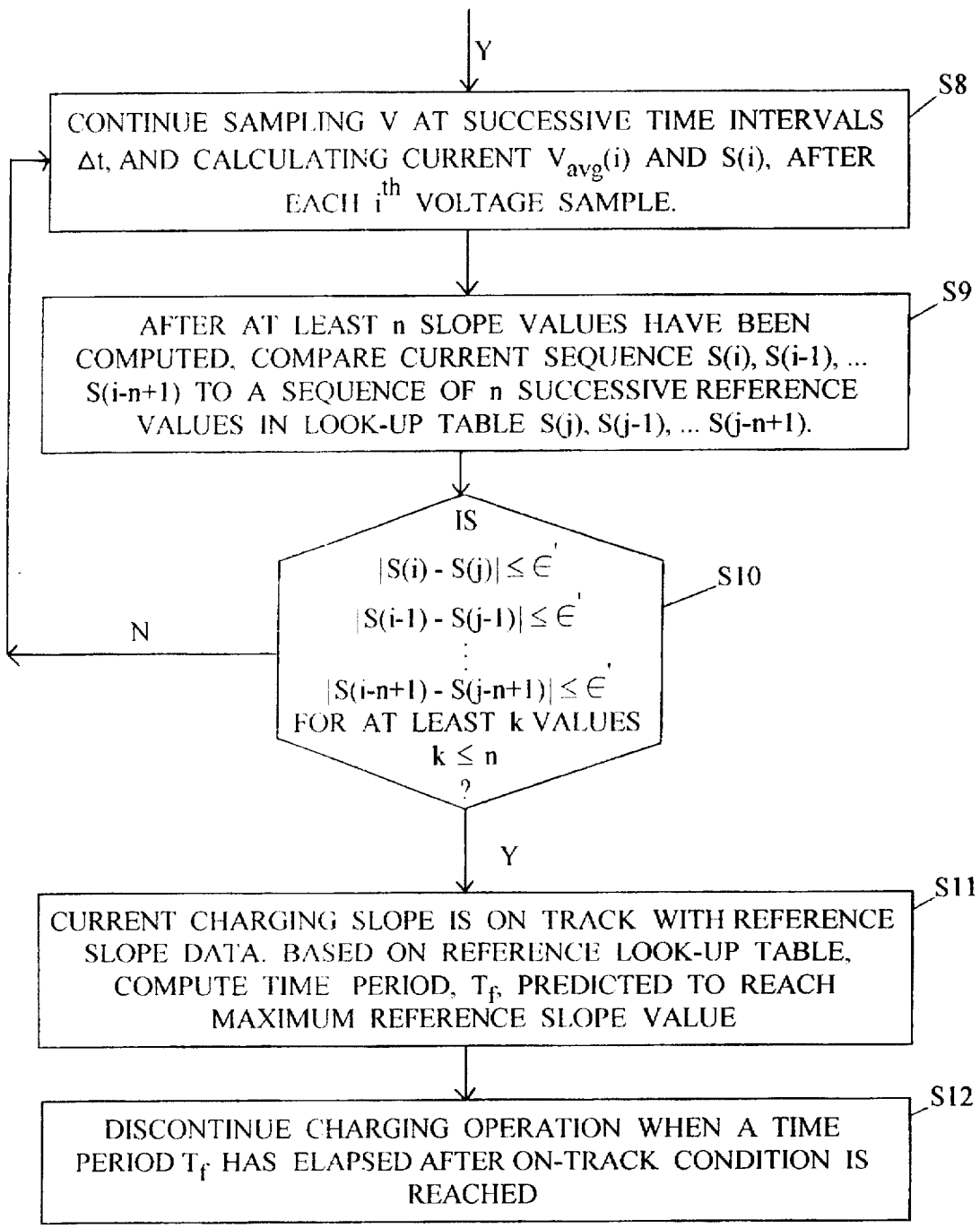

The combination of FIGS. 5A and 5B are a flow chart of the battery-charger control procedure of the invention.

Figure 6:
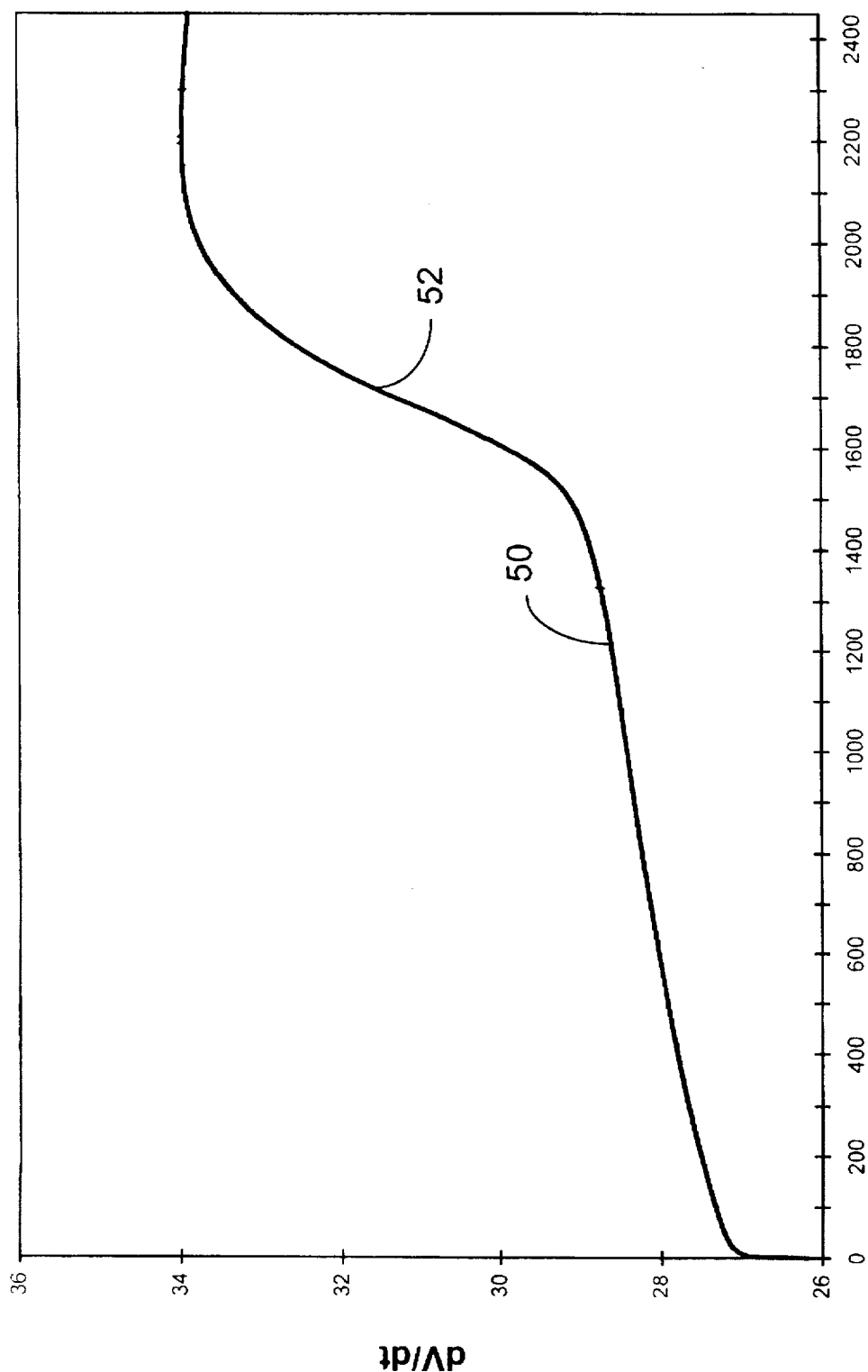

FIG. 6 is a plot of a typical voltage behavior of a nickel-cadmium battery during charge under normal conditions.

Figure 7:
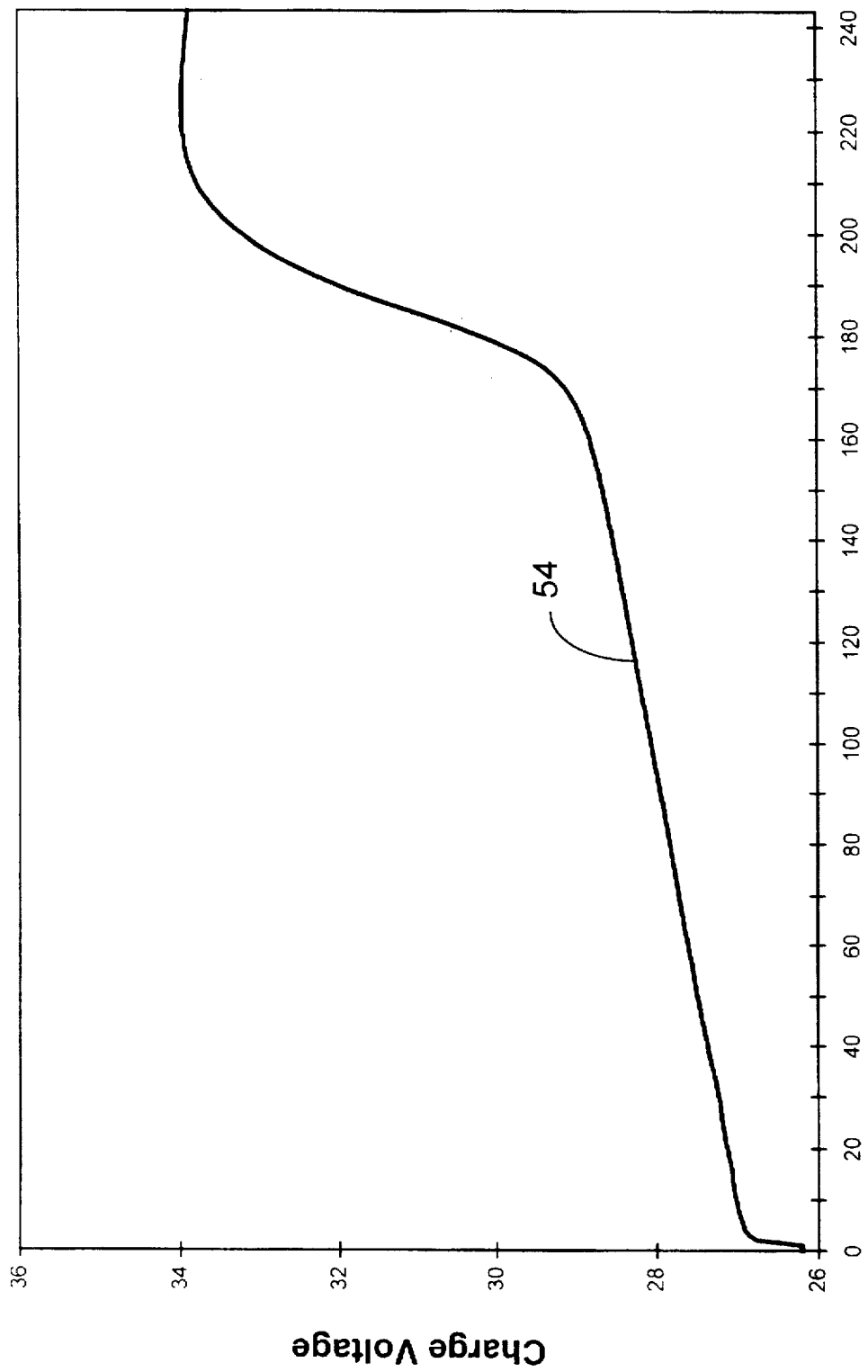

FIG. 7 is a plot illustrating the effect of varying the sampling rate sampling the voltages of FIG. 6 to produce a voltage response normalized to the reference curve.

Figure 8:
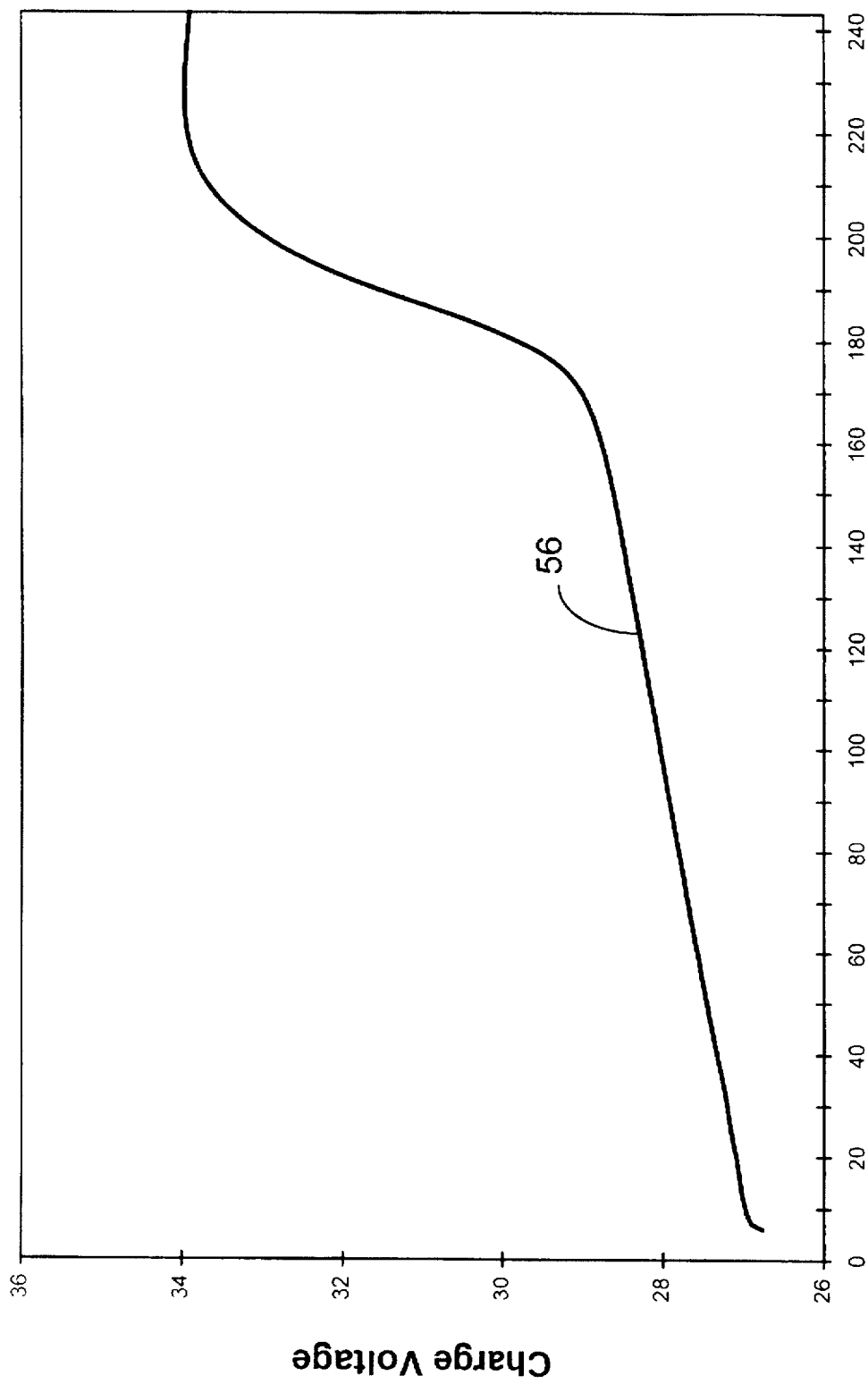

FIG. 8 shows a plot of the moving average of the normalized voltage response based on 6 voltage samples.

Figure 9:
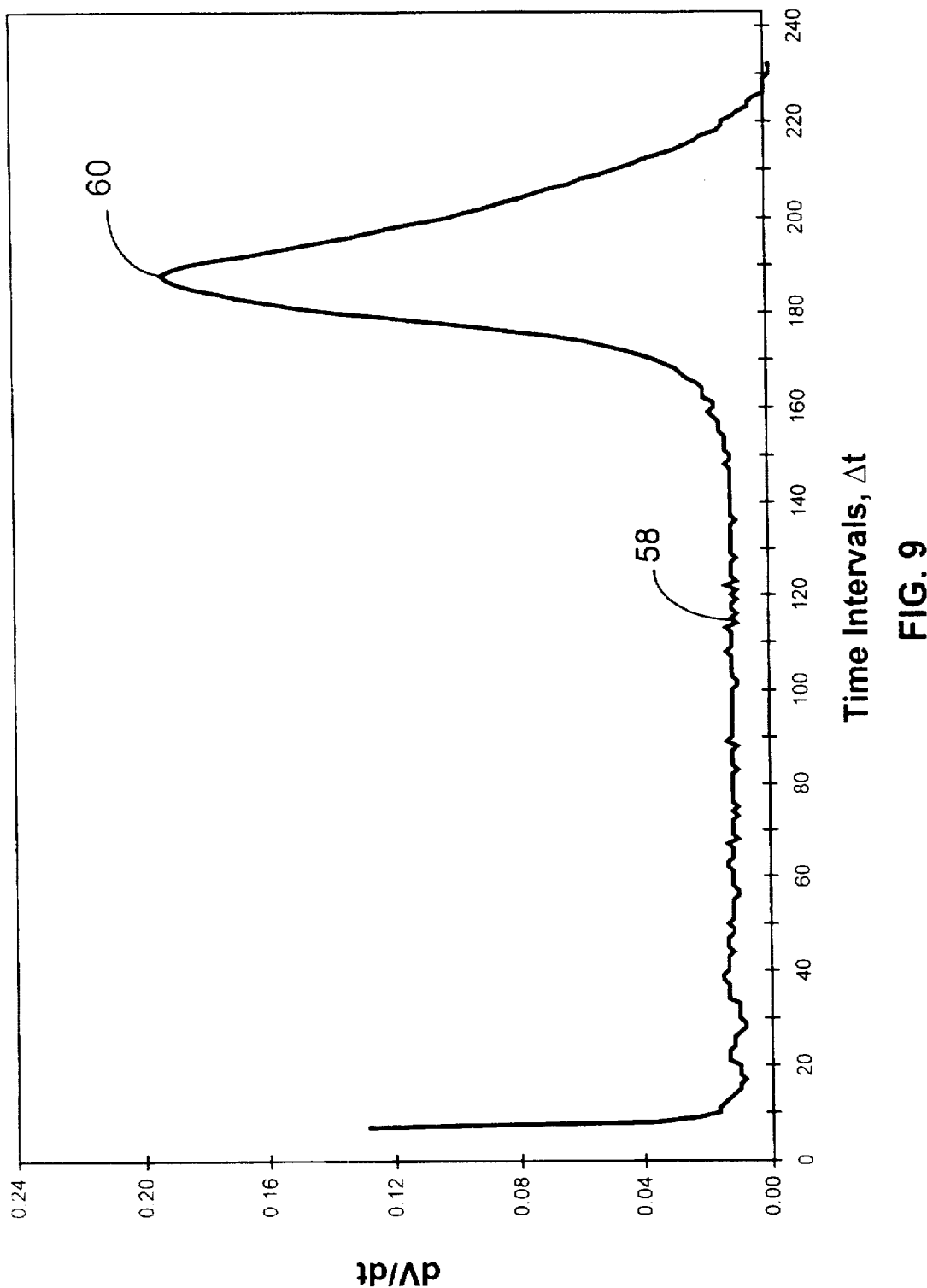

FIG. 9 shows the slope curve corresponding to the average-voltage plot of FIG. 8 based on differences of successive values.

Figure 10:
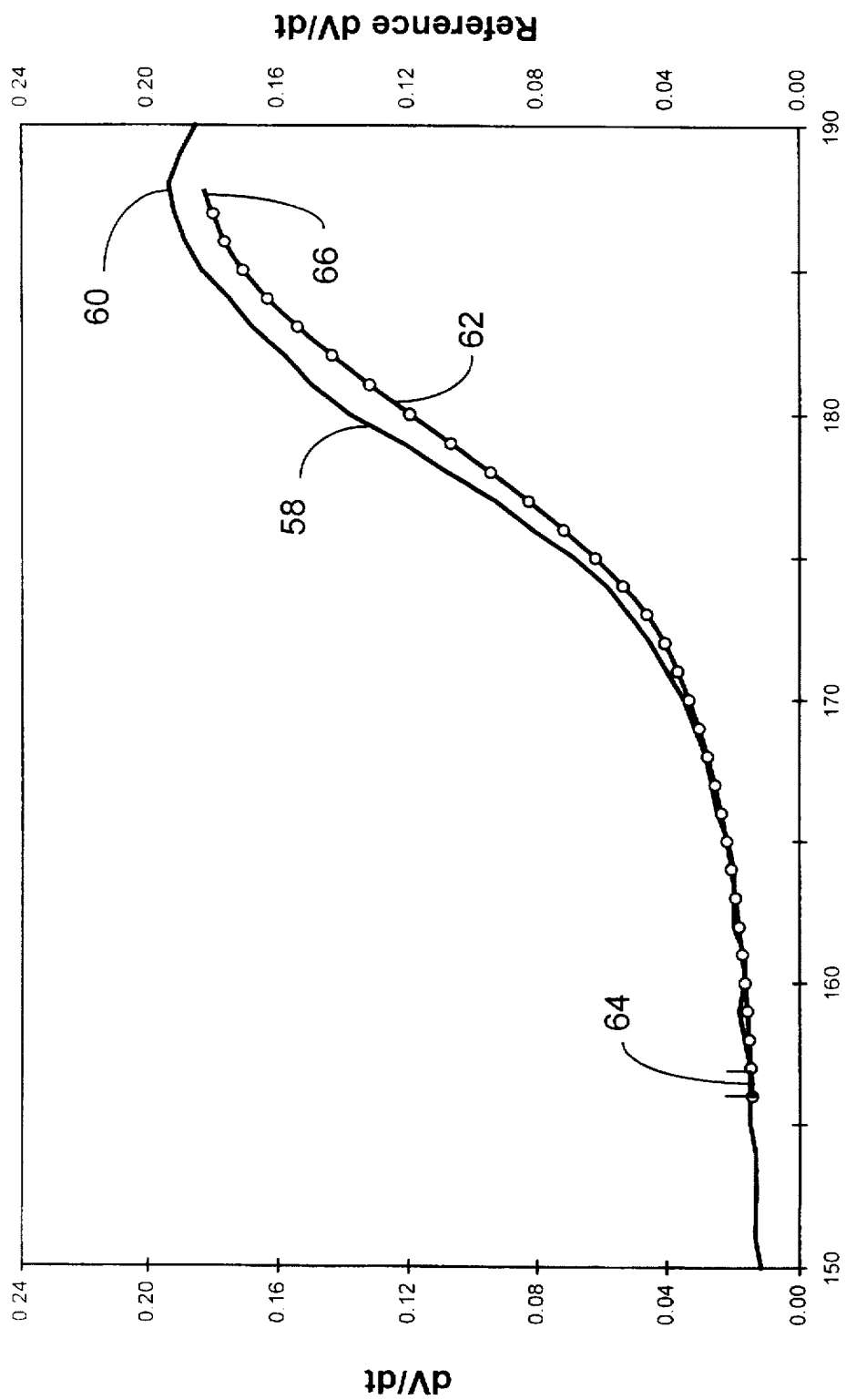

FIG. 10 shows the calculated slope curve of FIG. 9 overlapping the reference curve for the system and illustrates the initial matching of the two curves based on a moving window of nine slope values.

Figure 11:
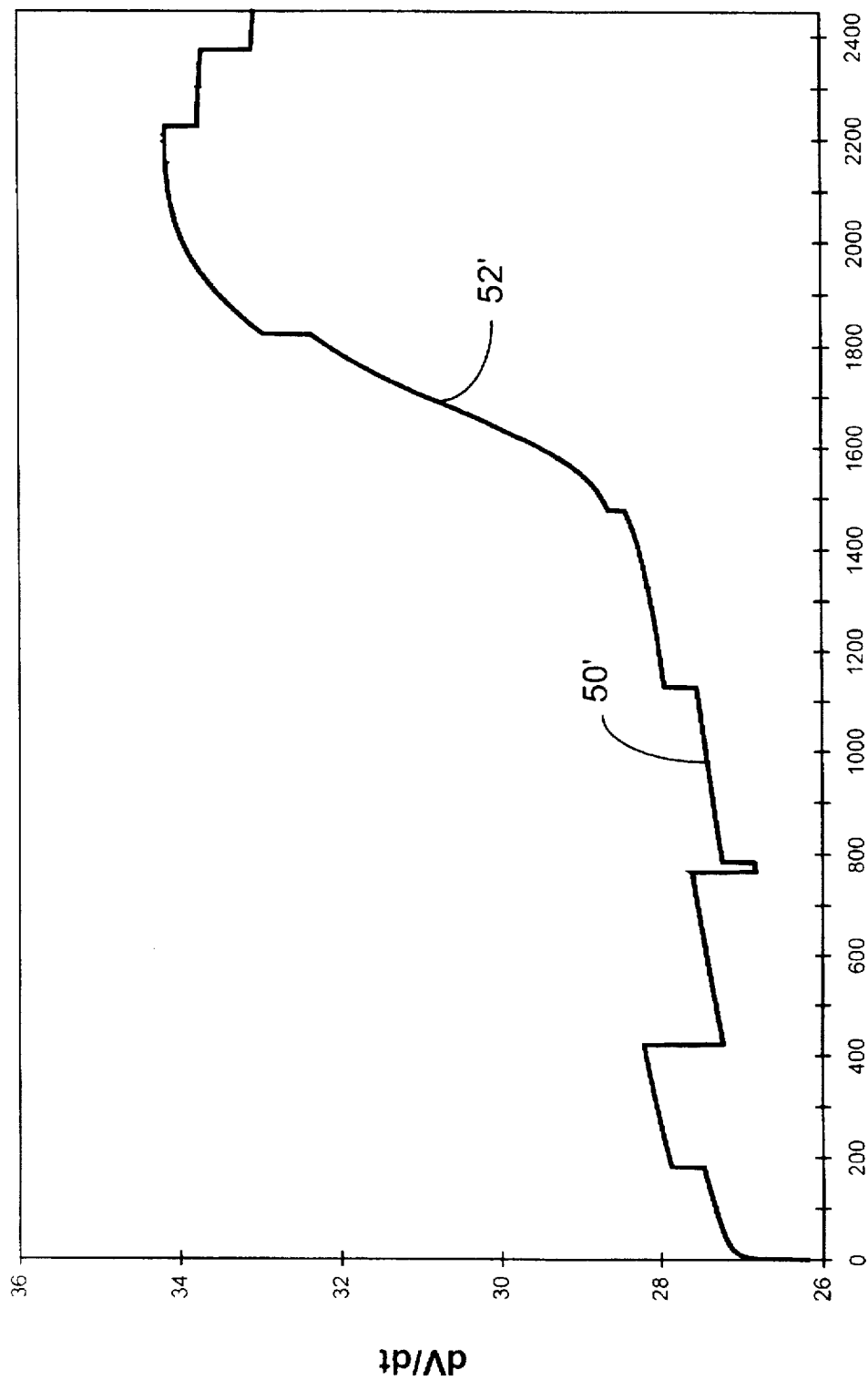

FIG. 11 is a plot of a simulated voltage behavior for the same nickel-cadmium battery of FIG. 6 where the voltage is subjected to extreme perturbations caused by transient loads.

Figure 12:
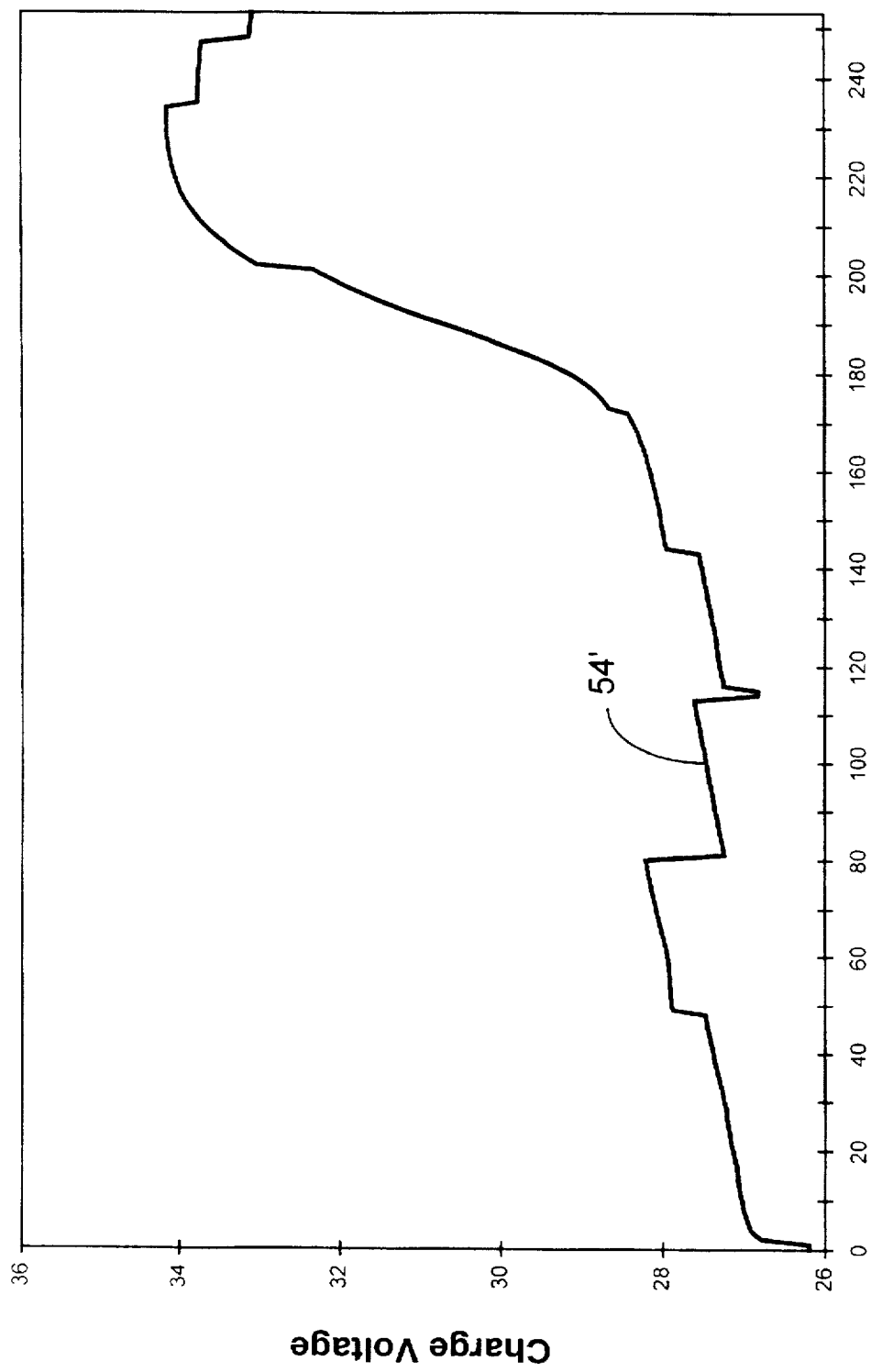

FIG. 12 is a plot illustrating the effect of varying the sampling rate sampling the voltages of FIG. 11 to produce a voltage response normalized to the reference curve.

Figure 13:
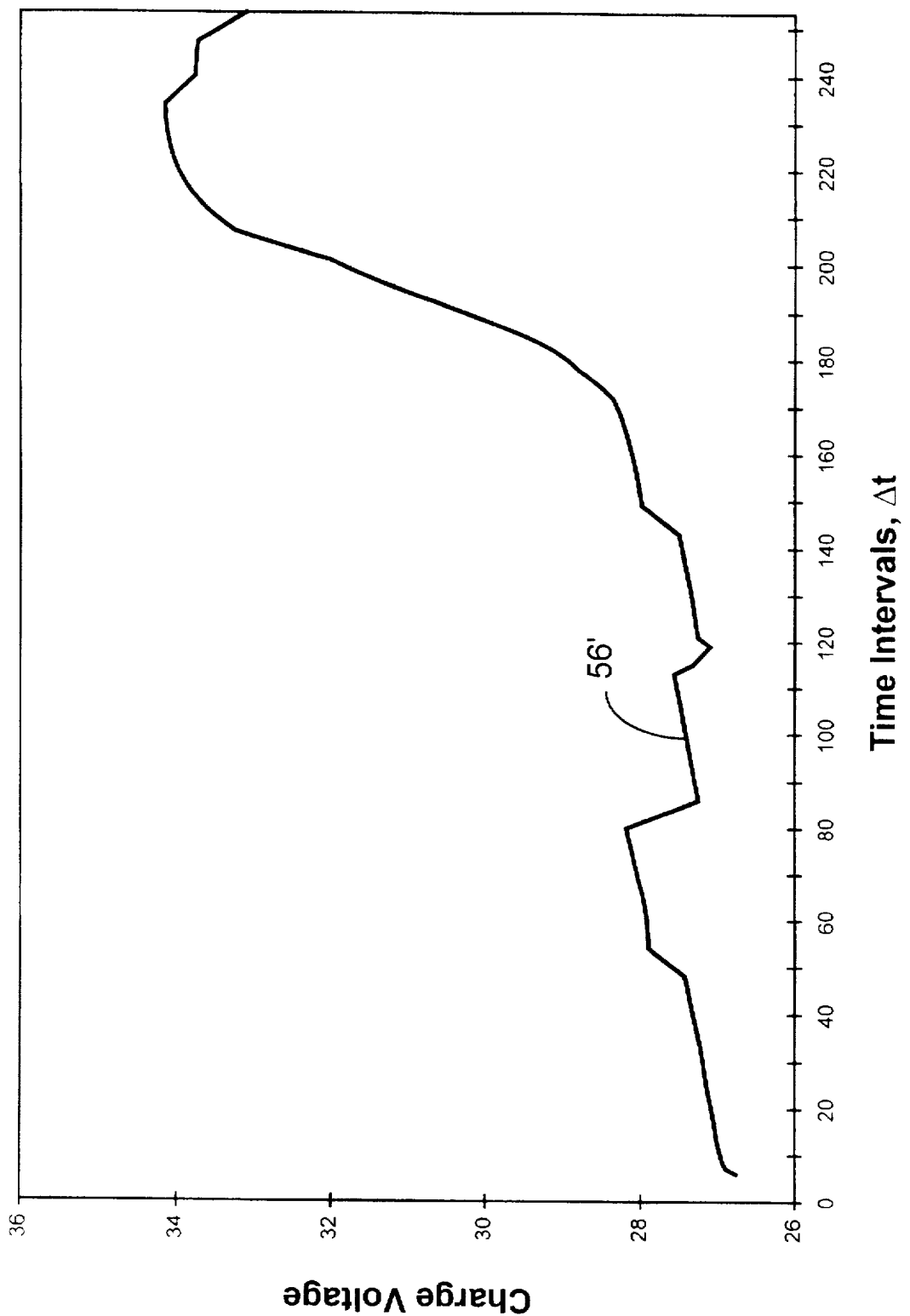

FIG. 13 shows a plot of the moving average of the normalized voltage response based on 6 voltage samples.

Figure 14:
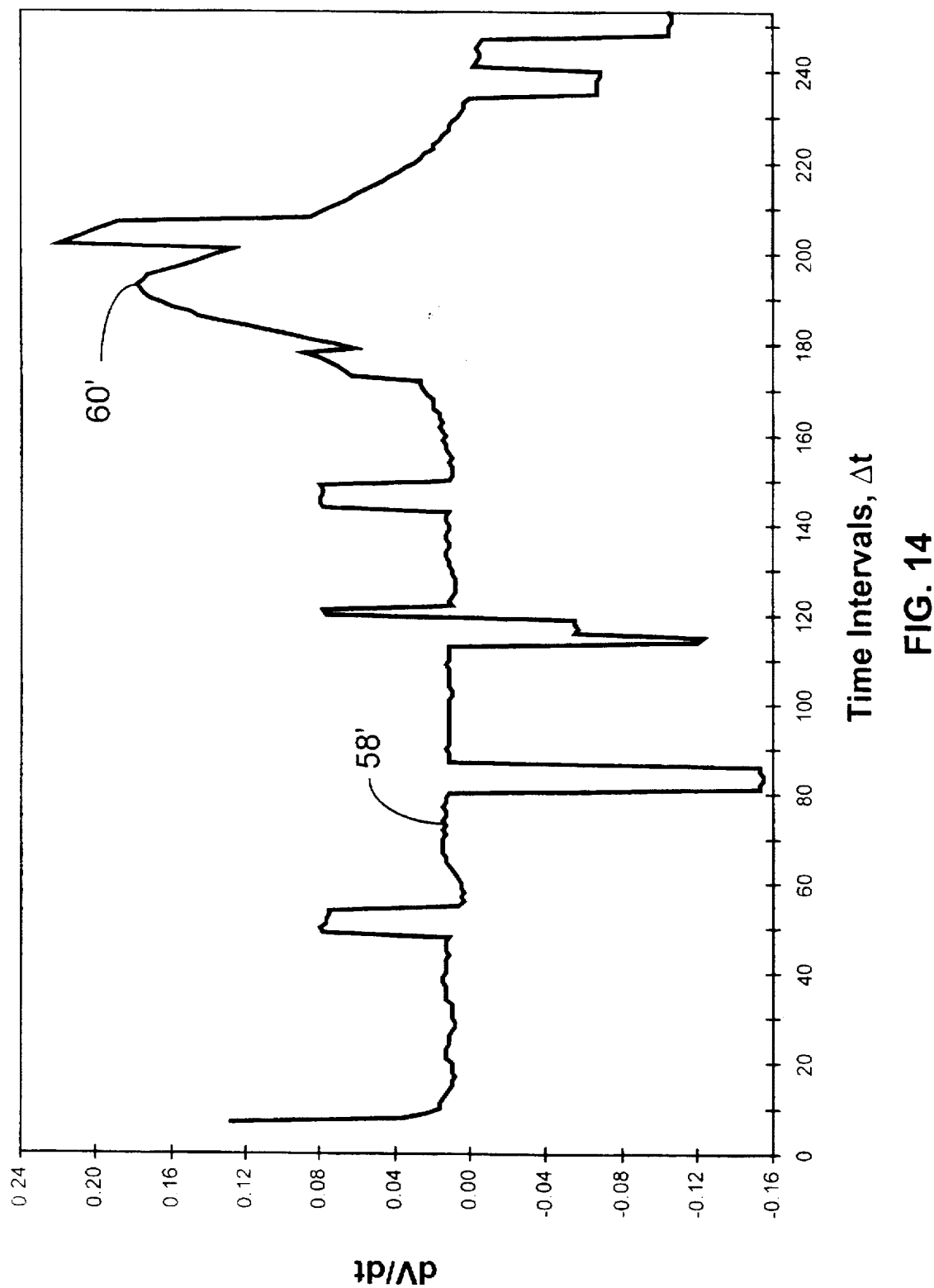

FIG. 14 shows the slope curve corresponding to the average-voltage plot of FIG. 13 based on differences of successive values.

Figure 15:
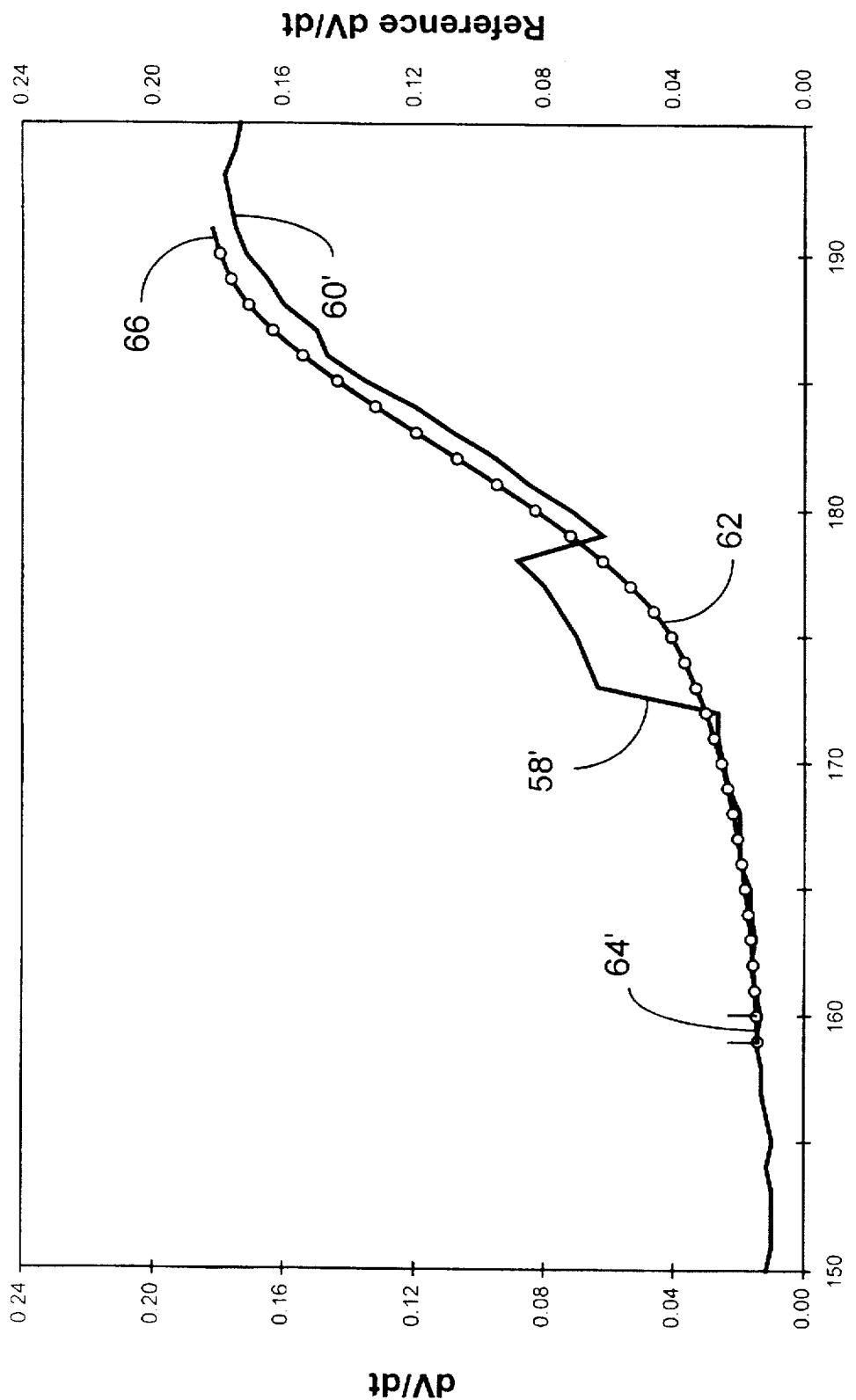

FIG. 15 shows the calculated slope curve of FIG. 14 overlapping the reference curve for the system and illustrates the initial matching of the two curves based on a moving window of nine slope values.

DESCRIPTION OF THE PREFERRED EMBODIMENTS OF THE INVENTION

One of the main aspects of this invention lies in the idea of predicting the time remaining to achieve fast-charge termination at the voltage inflection point of a secondary battery being charged at a constant-current rate by tracking its voltage behavior and matching it to a characteristic reference curve. Thus, a first step of the invention requires the development of the reference curve model for the particular type of battery of interest. I found that the combination of an exponential function and a sinc function provides a composite curve that is very suitable for modeling the behavior of the terminal voltage's first-order time derivative in conventional secondary batteries after the voltage rise initially seen in a totally discharged battery.

Figure 1:
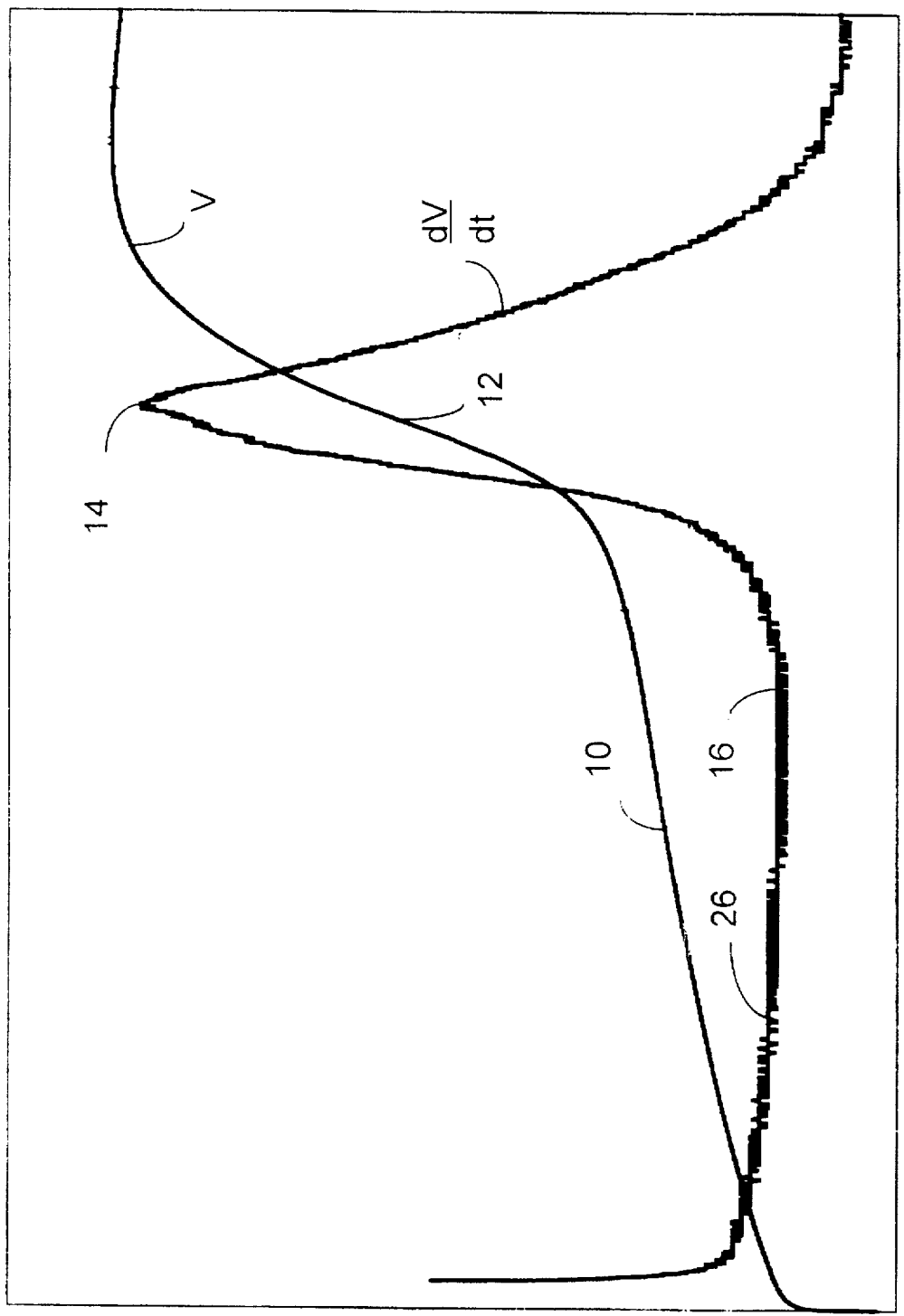
FIG. 1 is a graph illustrating the terminal voltage behavior as a function of time of a conventional secondary battery being charged under constant-current rate; the figure also shows a plot of the first-order derivative of the voltage curve.
Figure 2:
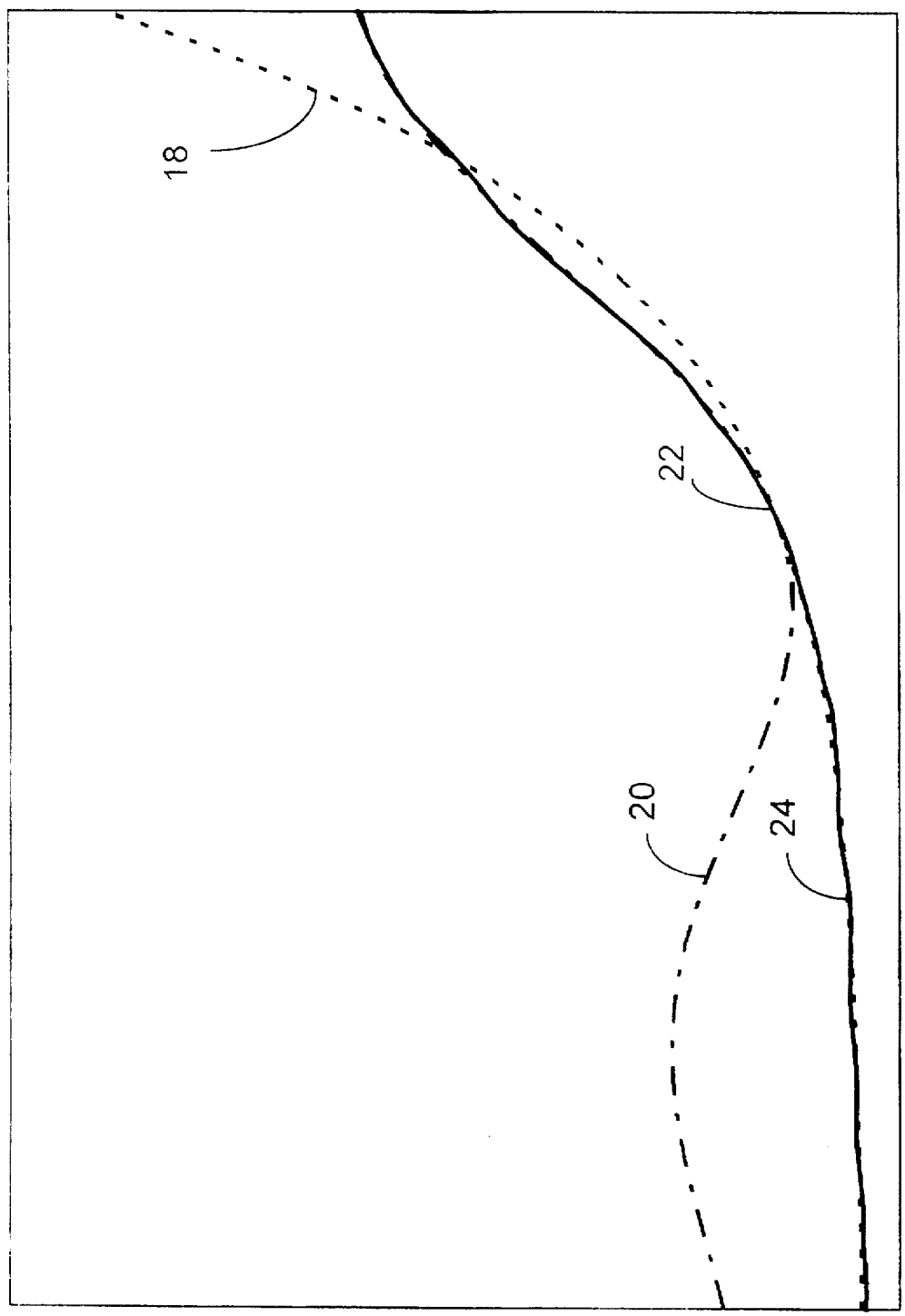
FIG. 2 is a plot of an exponential function, a sinc function, and a combination of the two for the purpose of modeling the functionality of the first-order time derivative of the terminal voltage of a secondary battery being charged at a constant-current rate.

Referring to the drawings, wherein like parts are designated throughout with like numerals and symbols, FIG. 2 illustrates a dotted exponential curve 18 and a dashed sinc curve 20 sharing a common point 22. By combining the first portion of the exponential curve 18 (preceding point 22) with the second portion of the sinc curve 20 (following point 22), it is readily apparent that the resulting combination, shown as the continuous curve 24, closely matches the time functionality of the voltage derivative shown in FIG. 1 (in particular, the portion bounded approximately by points 26 and 14; that is, excluding the initial charge phase). Accordingly, the general exponential and sinc function equations can be used to fit actual battery data and produce a reference curve model of the type represented by curve 24.

As well understood in the art of mathematical modeling, an exponential time function $f_e(t)$ is represented by the equation $$f_e(t) = \%k_1 \exp(k_2 t) + k_3, \quad (1)$$

where $k_1$, $k_2$ and $k_3$ are constant coefficients representing magnitude, time and offset scaling, respectively. These parameters are calculated for a given battery by obtaining experimental voltage-versus-time data during fast charge at a given constant-current rate, by calculating corresponding empirical first derivative data, and then by curve fitting these data to Equation 1 according to known regression procedures.

Similarly, a sinc time function $f_s(t)$ is represented by the equation $$f_s(t) = k_4 \text{sinc}(k_5 t) + k_6, \quad (2)$$

where $k_4$, $k_5$ and $k_6$ are again constant coefficients representing magnitude, time and offset scaling, respectively. These parameters are also calculated for a given battery by obtaining experimental voltage-versus-time data during fast charge at the same constant-current rate, and then by calculating corresponding empirical first derivative data and by curve fitting these data to Equation 2 according to some conventional regression procedure. The composite curve 24 in FIG. 2 is such a fit developed from voltage-versus-time data corresponding to nickel-cadmium batteries fast charged at a current rate equal to the rated capacity.

Once a reference curve such as curve 24 is developed for a given type of battery, discrete derivative values can be calculated and tabulated for reference at specific time intervals corresponding to the sampling intervals utilized during the charging operation. For example, if the terminal voltage during fast charge is being monitored by sampling it every ten seconds, the reference curve 24 is used to calculate and tabulate derivative values at ten-second intervals. As voltage data are collected through sampling during the charging operation, approximate derivative values are determined by conventional procedures, such as by differences of consecutive values over the sampling period, and compared to the tabulated data in search of a match. Thus, as the charging operation progresses, the idea of the invention is to find the exact point on the reference curve 24 corresponding to the current charging state of the battery. When that point is identified by matching the sampled data with the reference data, the charging operation is determined to be "on track" or "on slope" with the reference curve 24, which is then used to simulate the balance of the fast-charging process. In particular, once the charging operation is on track, the remaining charging time is set as the time required to reach the inflection point 12 as identified by the maximum 14 in the reference curve 24.

Figure 3:
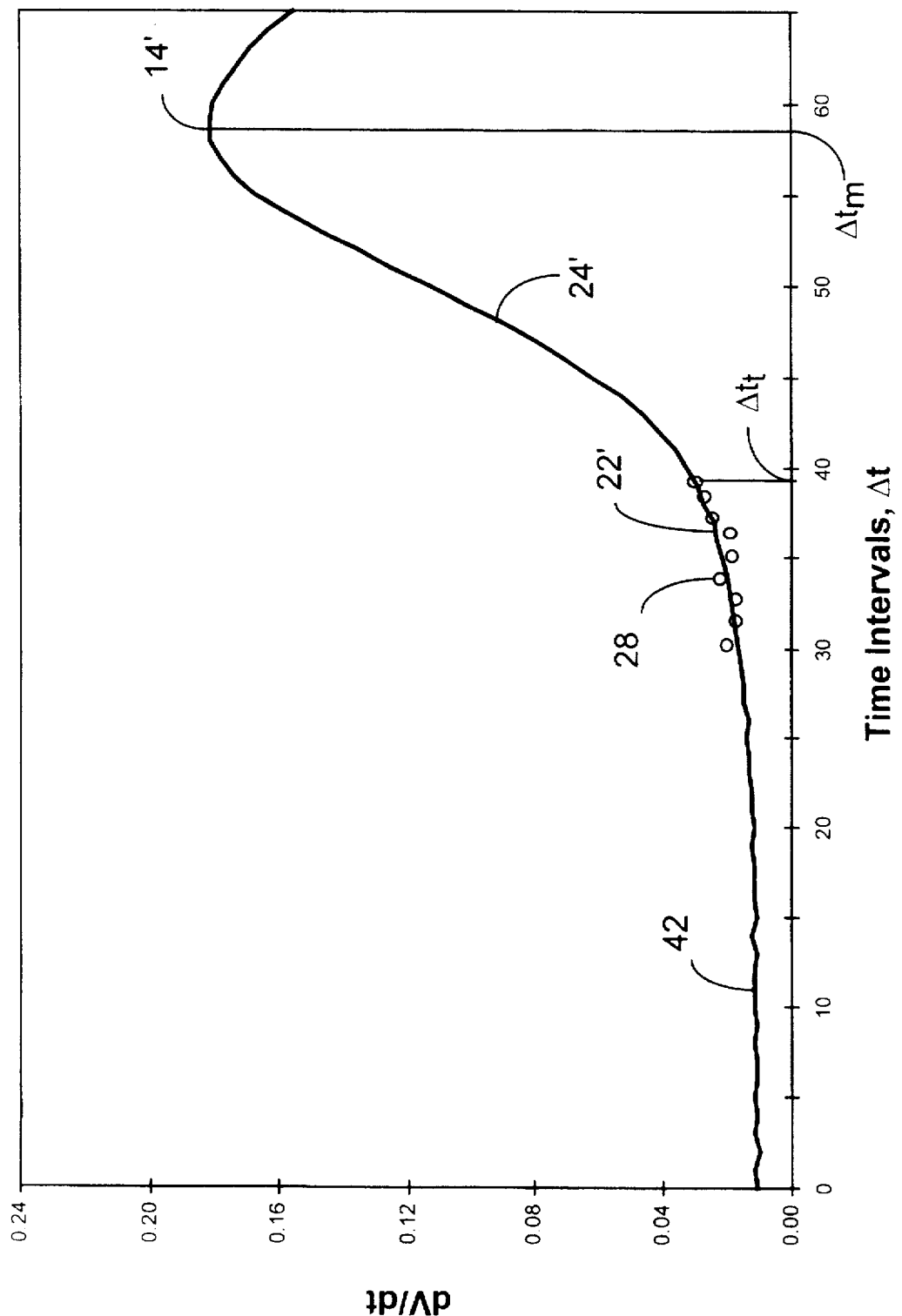
FIG. 3 is a plot of a representative composite exponential-sinc function for a nickel-cadmium battery and a sequence of nine derivative values calculated from voltage data sampled during the charging operation illustrating an "on track" condition for the process.

Referring to FIG. 3, for example, let the reference curve 24' express graphically the time function of the derivative dV/dt of the terminal potential of a nickel-cadmium battery being charged at 1C current rate (that is, a rate equal to one times the rated capacity of the battery), for which a composite analytical relation has been produced from empirical data in the form of Equations 1 and 2 (each applicable before and after point 22', respectively). Time is expressed in terms of successive time intervals $\Delta t$. The composite relation is used to calculate a table of reference values for dV/dt at predetermined time intervals $\Delta t$ equal to the time intervals chosen for sampling the battery potential during charge. These values are stored to provide a look-up table of reference derivative values at each time interval $\Delta t$ for use during the charging process. As charging progresses, the slope of the sampled potential-versus-time data is similarly calculated at the end of each time interval $\Delta t$, the computed slope is compared to the data in the look-up table, and the closest match (within a judiciously selected tolerance margin) is identified and recorded. The process is repeated at each subsequent time interval and each time a sequence of successive calculated slopes is compared to a sequence of successive reference slopes in the look-up table through a chosen moving window $n\Delta t$ (where n is the number of successive samples last processed) until a predetermined number ($\leq n$) of matches is identified. At that point, the sampled slopes are considered to be on track (on slope) with the reference curve 24' and the curve is used prospectively to determine the remaining charging time for the slope curve to reach the maximum 14' (which in turn corresponds to the inflection point in the voltage-versus-time curve). Thus, in the example of FIG. 3, where slopes calculated from periodic sampling are indicated by circles 28, assuming that a moving window of nine samples (n=9) is used and that six matches are required to identify an on track condition with respect to the reference curve 24', such a condition would be identified after the sample taken after time interval $\Delta t_r$ had been processed. Based on that information, the procedure of the invention would estimate the time left to reach a full charge condition by summing the time intervals separating $\Delta t_r$ from $\Delta t_m$, the time interval after which the maximum 14' is reached along the plot of curve 24'. Obviously, the same determination can be made equivalently by counting the time intervals left in the look-up table to reach the maximum reference slope value. The charging operation is then continued for that amount of time without further monitoring of the terminal potential.

Figure 4:
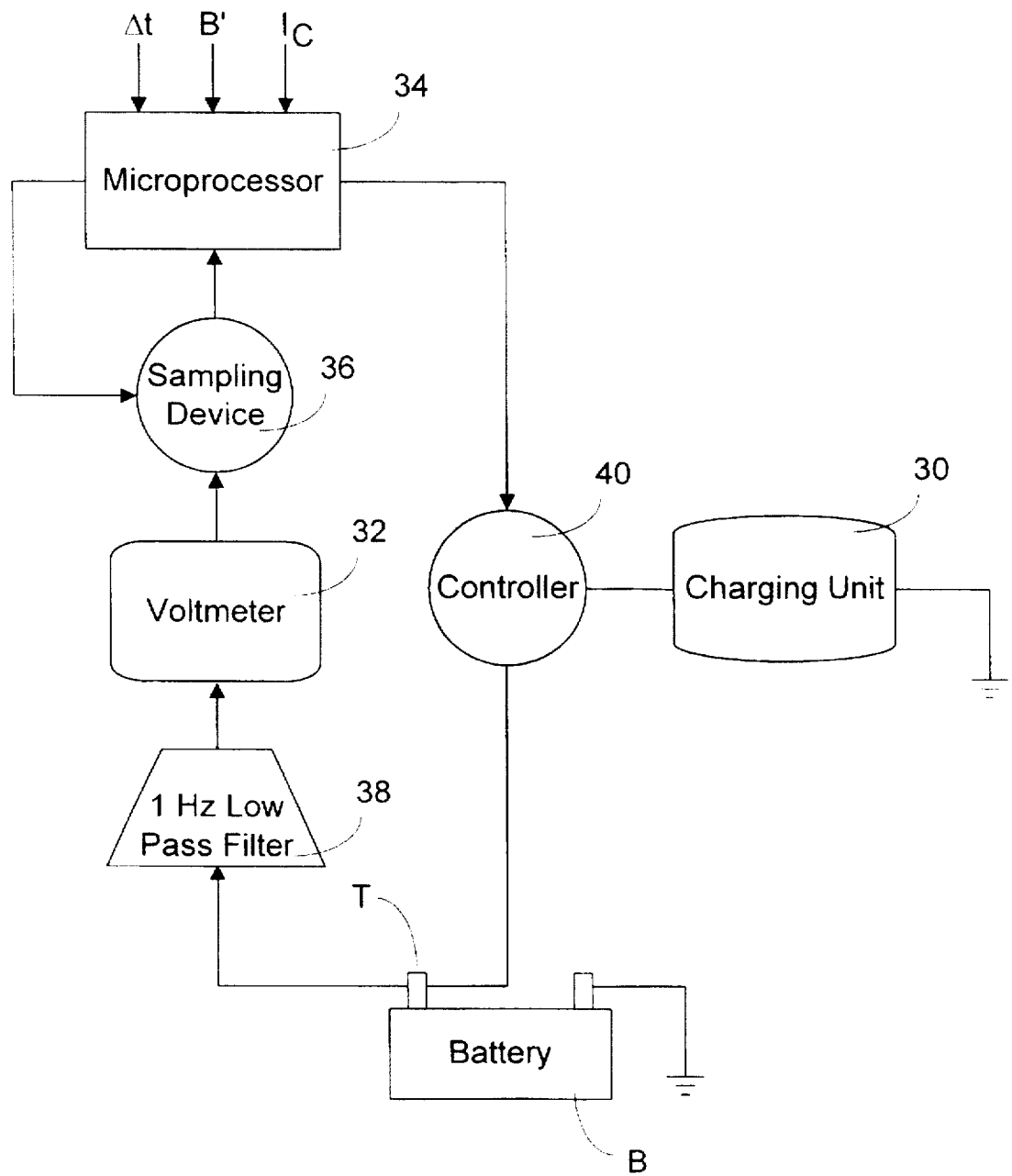
FIG. 4 is a schematic representation of the components of a battery charger according to the invention.

In practice, the method of the invention is implemented by an algorithm incorporated in a microprocessor controlling a conventional battery charger. As illustrated schematically in FIG. 4, the voltage (with respect to ground) at the terminal T of a battery B being charged by a conventional charging unit 30 is monitored by a voltmeter 32 and its readings are periodically sampled, digitized and fed to a microprocessor 34 through a sampling device 36 clocked by the microprocessor. The voltage signal is preferably filtered with a 1 Hz low pass filter 38 to remove any wide-band noise that could interfere with the proper operation of the algorithm. The microprocessor 34 takes the filtered, digitized voltage data and preferably utilizes a windowed moving average ($V_{avg}$) of the last m voltage readings (m being an empirical arbitrary number), rather than individual voltage data, to minimize the effects of transient loads on the battery. The microprocessor 34 computes currently the first derivative of the charge voltage using the last two data points in the moving average. The algorithm then attempts to match the first derivative of the current average charge voltage so computed with a value in the reference look-up table, which is calculated from the applicable composite exponential-sinc function at time intervals $\Delta t$. After sufficient samples (n) are taken, the matching process is carried out by attempting to match a number ($\leq n$) of consecutive derivatives of the charge voltage with a corresponding number of successive values in the look-up table. A certain amount of error is allowed in the matching of each data point and a certain number of mismatches is also accepted within the set of consecutive values being matched, as one skilled in the art would readily be able to design into the process as permissible approximation parameters and as a practical approach to finding an acceptable match. When the microprocessor 34 determines that a match within the set tolerance parameters has occurred, the charging operation is considered to be on track with the reference look-up table (and, correspondingly, with the reference curve 24'). Accordingly, the time required to reach the inflection point is determined by the microprocessor 34 by multiplying the sampling time interval by the number of values in the look-up table remaining after the match has occurred. A controller 40 is then set to switch the charging unit 30 to trickle charge when that time has elapsed.

It is noted that the sampling time interval $\Delta t$, the type B' of battery being charged, and the constant-current charging rate $I_c$ are preferably provided by a user as inputs to the microprocessor 34, so that an applicable reference look-up table can be generated from corresponding reference composite curves (based on Equations 1 and 2) stored in memory for carrying out the procedure with a given battery B. $\Delta t$ is initially adjusted in an attempt to match the first series of values (an initial target value) in the reference curve table, as explained below.

It is known that the first-order time derivative of the voltage charge curve is affected by the initial charge state of the battery being charged. For example, the voltage rise of a fully discharged battery is not as rapid as that of a battery with 80–90% initial charge. In order to overcome the problem caused by this variation in voltage rise behavior in matching a standard reference curve, I found a solution based on normalizing the charge and reference data with respect to time. This is achieved by processing voltage data as a function of time intervals, rather than time. This dynamic time interval adjustment also keeps the process stable around the initial target value (discussed below) in the presence of local transients.

As mentioned above, it is a critical aspect of the present invention that the same voltage behavior characterized by a curve such as curve 10 in FIG. 1 is exhibited by a battery under charge no matter what its initial charge state happens to be. If the battery is fully discharged, the voltage increase occurs more slowly than if the battery is partially charged, but in all instances the voltage rise is similar to the functionality expressed by the characteristic curve for the particular battery being charged. Accordingly, if the battery's voltage (and/or its derivative) is plotted as a function of equal time intervals, rather than time, the length of the time interval can be adjusted so that the plot will substantially coincide with the reference behavior for the battery. That is, since the shape of the derivative curve is known and is substantially the same for the measured data and the reference curve, these can be made to match by varying the time interval of sampling so as to produce a normalized behavior. Thus, by assigning a value to $\Delta t$ and numbering each sample sequentially, each sample number i will correspond to an elapsed time i$\Delta t$. Slopes with respect to time intervals are correspondingly calculated as $dV/d\Delta t=[V(i)-V(i-1)]/|i-(i-1)|=V(i)-V(i-1)$. Based on this approach, it is clear that if $\Delta t$ is increased, fewer samples will be taken during the charging operation and the computed values for the "normalized" slope of the voltage-versus-time interval curve will also increase; the opposite will occur if $\Delta t$ is decreased and the number of samples proportionally increased. Accordingly, if the initial computed slopes do not match (within an allowed tolerance) the initial slope of the reference curve (as expressed in the look-up table), the selected time interval $\Delta t$ is adjusted to approximate the desired value. When that is achieved, the time interval so adjusted is used for the rest of the procedure.

For example, I chose to normalize the characteristic voltage rise displayed by a nickel-cadmium battery at the beginning of a charging cycle to about 0.01 volts/time-interval, the approximate initial value shown at point 42 on the reference curve 24', regardless of the battery's initial charge state. Accordingly, the first derivative values computed from sampled data during the charging operation are compared to the initial target slope of 0.01 volts/time-interval to determine whether a match exists. If not, the sampling time interval is shortened or lengthened (depending on whether the sampled derivative is too high or too low, respectively) and the matching process is restarted with the new $\Delta t$. The procedure is repeated and the time interval dynamically adjusted until the computed charge derivative falls within a predetermined error margin of the target value (for example, 0.002 for the 0.01 volts/time-interval value selected in the case of nickel-cadmium batteries). Once the initial target slope is matched by using a given time interval $\Delta t_i$, the charging process is considered normalized to the reference curve and sampling continues at the corresponding sampling rate until the process is found to be on track, as detailed above.

The basic steps of the preferred embodiment of the battery-charge control procedure of the invention are shown in the flow diagrams of FIG. 5A and 5B. The algorithm of the invention is initiated in step S1 by selecting an initial $\Delta t_{in}$ (and, correspondingly, an initial sampling rate). The terminal voltage of the battery being charged in step S2 is sampled in step S3 at successive time intervals $\Delta t_{in}$ and a running average of the voltage, $V_{avg}$, is computed in step S4 based on the last m voltage samples, where m is selected empirically to minimize the effects of noise and transient loads on the battery. I found that m=9 gives excellent results for nickel-cadmium batteries. In step S5, after sufficient voltage samples have been collected to generate at least two average values, the slope of the average voltage as a function of time interval is calculated currently after each time interval $\neq t_i$. That is, the slope corresponding to the sample taken after i time intervals is approximated by $$S(i)=dV_{avg}(i)/d\Delta t_i\text{-}V_{avg}(i-1). \qquad (3)$$

The current slope is then compared in step S6 to an initial target value, $S_{in}$, in the reference look-up table to confirm a match within a selected tolerance $\epsilon$ (such as, for example, requiring the absolute value of the difference to be within 2% of the target value). If a match is not found, the time interval is varied in step S7 according to a predetermined scheme to drive the computed slope toward the target value. Any numerical technique used to cause convergence could be used for this purpose, as well understood in the art of numerical methods. The procedure is repeated until a $\Delta t$ is found that produces a match between the computed slope and the target value on the reference curve (as expressed by the corresponding look-up table). The process then continues in step S8 using that $\Delta t$ as the sampling time interval. Each successive computed slope S(i) is compared currently in step S9 to the values in the look-up table to find a match within another selected tolerance $\epsilon'$ deemed practically acceptable for the application. The matching process is repeated after each time interval and a running window of n successive slope values, S(i), S(i-1) . . . S(i-n+1), is compared in step S10 to any sequence of correspondingly successive reference slopes in the look-up table, S(j), S(j-1), . . . S(j-n+1), until a desired number of matches (a fraction of n) is identified. In the preferred embodiment, I chose a window of nine successive values and a match of six out of nine was required to identify an "on track" condition. At that point, the remaining charging time for the process to reach full charge, $T_r$, is computed in step S11 by multiplying the time interval $\Delta t$ by the number of time intervals remaining in the reference look-up table to reach the maximum slope value. The fast-charging operation is continued for that amount of time without further sampling and then automatically terminated in step S12 to avoid overcharging.

The algorithm was tested under various random load conditions. In particular, unusual transient loads were applied to the battery being charged to determine whether the procedure of the invention would still correctly predict the inflection point in the voltage response of the system. FIGS. 6–10 illustrate the response of the algorithm to a simulated normal voltage curve of a nickel-cadmium battery under fast charge at a constant current equal to rated capacity when no load transients occur (that is, under ideal charging conditions). FIG. 6 shows a plot 50 of the typical voltage behavior of a nickel-cadmium battery being charged under such normal conditions. The plot 50 was generated from actual voltage data to determine the actual inflection point 52 for such a battery under nominal conditions. FIG. 7 is a plot 54 illustrating the effect of varying $\Delta t$ (and accordingly the sampling rate) on the voltage curve 50 to normalize it to the applicable reference curve. FIG. 8 illustrates a plot 56 of $V_{avg}$ based on six voltage samples (note that the curve begins after the sixth sample has been processed); and FIG. 9 shows the corresponding slope curve 58 based on differences of successive $V_{avg}$ values. The inflection point of the simulated sampled voltage curve 50 data is shown at the local maximum 60 of the slope curve 58. Finally, FIG. 10 shows the calculated slope curve 58 substantially overlapping the reference curve 62 (only some of the table values are shown for clarity) for the system and illustrates the initial matching of the two curves based on a moving window of nine slope values. The occurrence of the matching between the two slope curves during the simulation process (i.e., when the slope curve was considered "on track" by the algorithm) is indicated in the figure by the highlighted portion 64 for convenience of display. Note that during an actual charging operation sampling would stop after this point and the curve 58 would not be calculated to termination. The overlapping curves show that the time predicted to reach the maximum 66 on the reference curve 62 after the "on track" condition substantially coincides with the time left to reach the maximum 60 on the actual slope curve, which corresponds to the actual inflection point 52.

The algorithm was tested by repeating the procedure with the same battery data, but under simulated noise and transient-load conditions. That is, the voltage data of curve 50 in FIG. 6 was assumed to represent the nominal curve for the battery at hand and it was modified by introducing spurious loads at random. FIGS. 11–15 illustrate a simulation of the process when extreme voltage discontinuities are experienced by the battery being charged. Thus, the curve 50' in FIG. 11 represents rapid load changes that produce corresponding step variations in the nominal voltage curve 50. These variations are correspondingly seen as well in the normalized curve 54' of FIG. 12. The plot 56' of FIG. 13 illustrates the smoothing effect of the rolling six-sample averaging approach. The calculated slope curve 58' of FIG. 14 reflects the rapid voltage variations in the system. Even so, the procedure of the invention was able to match a nine-sample window of the slope curve 58' to the reference curve 62 and predict the time position of the inflection point for the system, as illustrated by the substantial coincidence of the time corresponding to the two maxima 60' and 66 in FIG. 15. The "on track" condition is again indicated in the figure by the highlighted portion 64'. Similarly, it is again noted that during an actual charging operation no sampling would occur after the inflection point has been predicted.

The efficacy of the invention was tested by simulating about 700 random charge conditions and the process was found to be accurate in about 96% of the cases. In all such cases the algorithm correctly predicted the time remaining to reach the inflection voltage from the time the "on track" condition was achieved, as measured by a coincidence of the predicted inflection point with the actual inflection point.

Appendix A is a listing of a Microsoft® Visual Basic®, Version 4.0, computer program utilized to implement the preferred embodiment of the invention with a Securaplane® BC 1300 battery charging system. This battery charger contains a Motorola MC68HC205C8 microcontroller in which the inflection point detection algorithm has been programmed into on-board PROM. The microcontroller also contains on-board RAM space where the digitized battery terminal voltage data are stored. The digitized voltage data are obtained via a MAX186 analog-to-digital converter which has, as its input, a 40AH SAFT NiCd battery. The BC 1300 system contains a DC to DC converter that supplies the battery with a constant current during fast charge. The microcontroller processes the battery voltage data and, based on the algorithm, switches the DC to DC converter from a constant current fast-charge mode to a trickle charge mode once the battery voltage inflection point has been reached, as predicted by the method of the invention.

Various changes in the details, steps and components that have been described may be made by those skilled in the art within the principles and scope of the invention herein illustrated and defined in the appended claims. For example, the number of samples used in computing the moving average $V_{avg}$ and in determining a match between the sampled data and the reference curve data could be changed empirically to account for different batteries and varied operating conditions. Similarly, the number of sample matches required to determine an "on track" condition could be varied to fit the requirements of particular applications.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

APPENDIX A

```
Module1 - 1

Option Base 1
Global Samples, Voltage(5000), Volt(5000), Volt_sim(5000), Avg(5000), Slope(5000
)
Global Delta1, Delta2, Number_of_hits, Allowed_misses, Slope_error
Global Threshold, Sample_every, Detect_samples, Sample_interval
Global Rate, Bound, Target_slope, Slope_fit(100)
Global File_name(1000), File_count, File_path$, Last_file
Global Random_sim, Sim_quantity, Step_bound, Noise_bound, Max_steps, Step(100),
Position(100)
```

APPENDIX A

Form1 - 1

```
Private Sub Calculate()
    Form1.Refresh
    Graph1.DataReset = 1
    Graph1.SymbolData = 9
    Graph1.NumPoints = Samples
    Graph1.ColorData = 9
    Graph1.ThickLines = 1
    Graph2.DataReset = 1
    Graph2.SymbolData = 9
    Graph2.NumPoints = Int(Samples)
    Graph2.TickEvery = Int(Samples / 10)
    Graph2.LabelEvery = Int(Samples / 10)
    Graph2.ColorData = 9
    Graph2.ThickLines = 1
    Graph3.DataReset = 1
    Graph3.SymbolData = 9
    Graph3.NumPoints = Int(Samples)
    Graph3.TickEvery = Int(Samples / 10)
    Graph3.LabelEvery = Int(Samples / 10)
    Graph3.ColorData = 9
    Graph3.ThickLines = 1
    Graph4.DataReset = 1
    Graph4.SymbolData = 9
    Graph4.NumPoints = Int(Samples)
    Graph4.TickEvery = Int(Samples / 10)
    Graph4.LabelEvery = Int(Samples / 10)
    Graph4.ColorData = 9
    Graph4.ThickLines = 1

Combo2.Clear
    Combo3.Clear
    Combo4.Clear
    Combo5.Clear
    Form1.Refresh 'Graph the original voltage data
    Do Until Sample = Samples
        Sample = Sample + 1
        Graph1.GraphData = Voltage(Sample)
    Loop For y = 1 To Delta1 - 1 'Pad un-averaged data with zeros
        Avg(y) = 0
        Graph3.GraphData = Avg(y)
    Next y
    For y = 1 To Delta1 + Delta2 - 2 'Pad non-sloped data with zeros
        Slope(y) = 0
        Graph4.GraphData = Slope(y)
    Next y 'Calculate and graph the average of voltage data subset
    Index = Delta1
    Delta_s = 1
    Start_x = 1
    For Sample = 1 To Index - 1
        Volt(Sample) = Voltage(Sample)
        Graph2.GraphData = Volt(Sample)
        String_data = Format(Sample, "####0000") + " / " + Format(Volt(Sample), "##0.00")
        Combo2.AddItem String_data
    Next Sample
    Sample = Index - 1
    Do Until Go_out = 1
        Sample = Sample + Delta_s
        If Sample > Samples Then
            GoTo Wrap_up
        End If
        Volt(Index) = Voltage(Sample)
```

APPENDIX A

Form1 - 2

```
        Graph2.GraphData = Volt(Index)
        String_data = Format(Index, "####0000") + " / " + Format(Volt(Index), "#
#0.00")
        Combo2.AddItem String_data
        For Pointer = Index To Index - Delta1 + 1 Step -1
            Sum = Sum + Volt(Pointer)
        Next Pointer
        Avg(Index) = Sum / Delta1
        Sum = 0
        Graph3.GraphData = Avg(Index)
        String_data = Format(Index, "####0000") + " / " + Format(Avg(Index), "##
0.00")
        Combo3.AddItem String_data
        'Calculate and graph first derivative of average voltage data subset
        If Index >= Delta1 + Delta2 - 1 Then
            Slope(Index) = (Avg(Index) - Avg(Index - Delta2 + 1)) / (Delta2 - 1)
            If On_slope = 0 Then
                For x = Start_x To 32
                    If Abs(Slope(Index) - Slope_fit(x)) <= Slope_error Then
                        Start_x = x + 1
                        Hit_counter = Hit_counter + 1
                        If Hit_counter = Number_of_hits Then
                            On_slope = 1
                            Inflection_sample = (32 - x) + Index
                            Label33.Caption = Inflection_sample
                            Label34.Caption = Miss_counter
                            Label35.Caption = x
                        End If
                        GoTo Jump_out
                    End If
                Next x
                No_hit = 1
Jump_out:       If No_hit = 1 Then
                    No_hit = 0
                    If Hit_counter <> 0 Then Miss_counter = Miss_counter + 1
                    If Miss_counter > Allowed_misses Then
                        Miss_counter = 0
                        Hit_counter = 0
                        Start_x = 1
                    End If
                End If
                If Slope(Index) > 0 And Start_x = 1 Then
                    Adj_rate = -Int((Slope(Index) - Target_slope) * Rate)
                    Delta_s = Delta_s + Adj_rate
                    If Delta_s < 1 Then Delta_s = 1
                    If Delta_s > Bound Then Delta_s = Bound
                End If
            End If
            Graph4.GraphData = Slope(Index)
            String_data = Format(Index, "####0000") + " / " + Format(Slope(Index
), "##0.000")
            Combo4.AddItem String_data
            Combo5.AddItem String_data + " " + Str$(Hit_counter) + " " + Str$(Mi
ss_counter) + " " + Str$(On_slope) + " " + Str$(Delta_s)
        End If
        If On_slope = 1 And Index = Inflection_sample Then
            Inflection = Volt(Index)
            Label17.Caption = Inflection
        End If
        Index = Index + 1
    Loop Wrap_up:
    If On_slope = 0 Then
        Label17.Caption = "Not Found"
        Label33.Caption = "------"
        Label34.Caption = "------"
        Label35.Caption = "------"
    End If
```

APPENDIX A

Form1 - 3

```
    Index = Index - 1
    Int_index = Int(Index / 10)
    Command3.Enabled = True
    Command1.Enabled = True
    Graph2.NumPoints = Index
    Graph2.TickEvery = Int_index
    Graph2.LabelEvery = Int_index
    Combo2.Text = Combo2.List(0)
    Graph3.NumPoints = Index - 1
    Graph3.TickEvery = Int_index
    Graph3.LabelEvery = Int_index
    Combo3.Text = Combo3.List(0)
    Graph4.NumPoints = Index - 1
    Graph4.TickEvery = Int_index
    Graph4.LabelEvery = Int_index
    Combo4.Text = Combo4.List(0)
    Combo5.Text = Combo5.List(0)

Graph1.DrawMode = 2
    Graph2.DrawMode = 2
    Graph3.DrawMode = 2
    Graph4.DrawMode = 2

End Sub

Private Sub Command1_Click()
    Form1.PrintForm
End Sub

Private Sub Command2_Click()
    End
End Sub

Private Sub Command3_Click()
    Combo1.Text = Combo1.List(0)
    Label26.Caption = Str$(Date) + " / " + Str$(Time)
    Label26.Refresh
    Label12.Caption = "Running"
    Calculate
    Label12.Caption = "Idle"
End Sub Private Sub Command4_Click()
    Load Form2
    Form2.Show
End Sub Private Sub Command5_Click()
        Open "C:\Myfiles\VB32\Data\Parms.cfg" For Output As #1
            Print #1, Delta1
            Print #1, Delta2
            Print #1, Number of hits
            Print #1, Allowed misses
            Print #1, Slope error
            Print #1, Target_slope
            Print #1, Rate
            Print #1, Bound
            Print #1, Sim quantity
            Print #1, Step bound
            Print #1, Noise bound
            Print #1, Max_steps
        Close #1
End Sub Private Sub Form_Activate()
    If File_count > 0 Then
        Combo2.Clear
```

APPENDIX A

Form1 - 4

```
        Combo3.Clear
        Combo4.Clear
        Combo5.Clear

If Random_sim = 0 Then
            If File_name(1) <> Last_file Then
                Combo1.Clear
                Label12.Caption = "Loading Data"
                Label12.Refresh
                Label27.Caption = File_name(1)
                Label27.Refresh
                Open File_name(1) For Input As #1
                Samples = 1
                Do Until EOF(1)
                    Input #1, Voltage(Samples)
                    String_data = Format(Val(Samples), "####0000") + " / " + For
mat(Voltage(Samples), "##0.00")
                    Combo1.AddItem String_data
                    If Not EOF(1) Then Samples = Samples + 1
                Loop
                Close #1
            End If
            Label1.Caption = Samples
            Label1.Refresh
            Last_file = File_name(1)
            Combo1.Text = Combo1.List(0)
            Label26.Caption = Str$(Date) + " / " + Str$(Time)
            Label26.Refresh
            Label12.Caption = "Running"
            Calculate
            Label12.Caption = "Idle"
        End If If Random_sim = 1 And File_count = 1 Then
            Open "C:\Myfiles\VB32\Data\Results.txt" For Output As #2
            Print #2, "Delta1: "; Delta1
            Print #2, "Delta2: "; Delta2
            Print #2, "Number of hits: "; Number_of_hits
            Print #2, "Allowed misses: "; Allowed_misses
            Print #2, "Slope error: "; Slope_error
            Print #2, "Target slope: "; Target_slope
            Print #2, "Rate: "; Rate
            Print #2, "Bound: "; Bound
            Print #2, "Sim quantity: "; Sim_quantity
            Print #2, "Step bound: "; Step_bound
            Print #2, "Max steps: "; Max_steps
            Print #2, "Noise bound: "; Noise_bound
            Label12.Caption = "Loading Data"
            Label12.Refresh
            Label27.Caption = File_name(1)
            Label27.Refresh
            Open File_name(1) For Input As #1
            Samples = 1
            Do Until EOF(1)
                Input #1, Volt_sim(Samples)
                If Not EOF(1) Then Samples = Samples + 1
            Loop
            Close #1
            For Sim_counter = 1 To Sim_quantity
                Combo1.Clear
                Label12.Caption = "Calculating"
                Label12.Refresh
                File_data = Format(Sim_counter, "###000")
                File_name(1) = "C:\Myfiles\VB32\Data\Sim" + Format(Sim_counter, "###000") + ".dat"
                Label27.Caption = File_name(1)
                Label27.Refresh
                Step_level = 0
                Number_of_steps = Int(Max_steps * Rnd) ' + 1
```

Form1 - 5                    APPENDIX A

```
            For Poynt = 1 To Number of steps
                Position(Poynt) = Int(Samples * Rnd + 1)
            Next Poynt
            For Level = 1 To Number of steps
                Step(Level) = Step_bound * 2 * (Int(11 * Rnd) / 10 - 0.5)
            Next Level
            Level = 1

For Poynt = 1 To Samples
                Noise_level = Noise_bound * 2 * (Int(11 * Rnd) / 10 - 0.5)
                For Pointer = 1 To Number of steps
                    If Position(Pointer) = Poynt Then
                        Step_level = Step_level + Step(Level)
                        Level = Level + 1
                    End If
                Next Pointer
                Voltage(Poynt) = Volt_sim(Poynt) + Step_level + Noise_level
                String_data = Format(Val(Poynt), "####0000") + " / " + Forma
t(Voltage(Poynt), "##0.00")
                Combo1.AddItem String_data
            Next Poynt
            Label1.Caption = Samples
            Label1.Refresh
            Last_file = File_name(1)
            Combo1.Text = Combo1.List(0)
            Label26.Caption = Str$(Date) + " / " + Str$(Time)
            Label26.Refresh
            Label12.Caption = "Running"
            Calculate
            Label12.Caption = "Storing Data"
            Print #2, Label26.Caption
            Print #2, File_name(1), Label7.Caption, Label35.Caption, Label33
.Caption
            Open File_name(1) For Output As #1
            For Poynt = 1 To Samples
                Print #1, Voltage(Poynt)
            Next Poynt
            Close #1
        Next Sim_counter
        Random_sim = 0
        Close #2
        Label12.Caption = "Idle"
    End If If Random_sim = 1 And File_count > 1 Then
        Open "C:\Myfiles\VB32\Data\Results.txt" For Output As #2
        Print #2, "Delta1: "; Delta1
        Print #2, "Delta2: "; Delta2
        Print #2, "Number of hits: "; Number_of_hits
        Print #2, "Allowed misses: "; Allowed_misses
        Print #2, "Slope error: "; Slope_error
        Print #2, "Target slope: "; Target_slope
        Print #2, "Rate: "; Rate
        Print #2, "Bound: "; Bound
        Print #2, "Sim quantity: "; Sim_quantity
        Print #2, "Step bound: "; Step_bound
        Print #2, "Max steps: "; Max_steps
        For Sim_counter = 1 To File_count
            Combo1.Clear
            Label12.Caption = "Loading Data"
            Label12.Refresh
            Label27.Caption = File_name(Sim_counter)
            Label27.Refresh
            Open File_name(Sim_counter) For Input As #1
            Samples = 1
            Do Until EOF(1)
                Input #1, Voltage(Samples)
                String_data = Format(Val(Samples), "####0000") + " / " + For
mat(Voltage(Samples), "##0.00")
```

APPENDIX A

Form1 - 6

```
                Combo1.AddItem String data
                If Not EOF(1) Then Samples = Samples + 1
            Loop
            Close #1
            Label1.Caption = Samples
            Label1.Refresh
            Last_file = File_name(Sim_counter)
            Combo1.Text = Combo1.List(0)
            Label26.Caption = Str$(Date) + " / " + Str$(Time)
            Label26.Refresh
            Label12.Caption = "Running"
            Calculate
            Label12.Caption = "Storing Data"
            Form1.Refresh
            Print #2, Label26.Caption
            Print #2, File_name(Sim_counter), Label7.Caption, Label35.Caption
        Next Sim_counter
        Random_sim = 0
        Close #2
        Label12.Caption = "Idle"
    End If
    End If
End Sub
Private Sub Form_Load()
    File_path$ = "C:\Myfiles\VB32\Data"
    Samples = 0

Open "C:\Myfiles\VB32\Data\Parms.cfg" For Input As #1
    Input #1, Delta1
    Input #1, Delta2
    Input #1, Number_of_hits
    Input #1, Allowed_misses
    Input #1, Slope_error
    Input #1, Target_slope
    Input #1, Rate
    Input #1, Bound
    Input #1, Sim_quantity
    Input #1, Step_bound
    Input #1, Noise_bound
    Input #1, Max_steps
    Close #1

Randomize

Text1.Text = Delta1
    Text2.Text = Delta2
    Text3.Text = Number_of_hits
    Text4.Text = Allowed_misses
    Text5.Text = Slope_error
    Text6.Text = Target_slope
    Text7.Text = Rate
    Text8.Text = Bound
    Text9.Text = Sim_quantity
    Text10.Text = Step_bound
    Text11.Text = Max_steps
    Text12.Text = Noise_bound
    Label1.Caption = Samples
    Label12.Caption = "Idle"
    Label26.Caption = Str$(Date) + " / " + Str$(Time)
    Label26.Refresh 'Define Curve fit coefficients
    'Slope_fit(1) = 0.0124
    'Slope_fit(2) = 0.0125
    'Slope_fit(3) = 0.0127
    'Slope_fit(4) = 0.0129
    'Slope_fit(5) = 0.0131
```

APPENDIX A

```
Form1 - 7
    'Slope_fit(6) = 0.0134
    'Slope_fit(7) = 0.0136
    'Slope_fit(8) = 0.014
    Slope_fit(1) = 0.0144
    Slope_fit(2) = 0.0148
    Slope_fit(3) = 0.0153
    Slope_fit(4) = 0.0159
    Slope_fit(5) = 0.0166
    Slope_fit(6) = 0.0174
    Slope_fit(7) = 0.0184
    Slope_fit(8) = 0.0194
    Slope_fit(9) = 0.0207
    Slope_fit(10) = 0.0221
    Slope_fit(11) = 0.0237
    Slope_fit(12) = 0.0256
    Slope_fit(13) = 0.0279
    Slope_fit(14) = 0.0304
    Slope_fit(15) = 0.0334
    Slope_fit(16) = 0.0368
    Slope_fit(17) = 0.0407
    Slope_fit(18) = 0.0462
    Slope_fit(19) = 0.0533
    Slope_fit(20) = 0.0618
    Slope_fit(21) = 0.0718
    Slope_fit(22) = 0.0829
    Slope_fit(23) = 0.0948
    Slope_fit(24) = 0.1072
    Slope_fit(25) = 0.1197
    Slope_fit(26) = 0.132
    Slope_fit(27) = 0.1436
    Slope_fit(28) = 0.1542
    Slope_fit(29) = 0.1634
    Slope_fit(30) = 0.1709
    Slope_fit(31) = 0.1764
    Slope_fit(32) = 0.1799
End Sub Private Sub Text1_Change()
    Delta1 = Val(Text1.Text)
End Sub Private Sub Text10_Change()
    Step_bound = Val(Text10.Text)
End Sub Private Sub Text11_Change()
    Max_steps = Val(Text11.Text)
End Sub Private Sub Text12_Change()
    Noise_bound = Val(Text12.Text)
End Sub Private Sub Text2_Change()
    Delta2 = Val(Text2.Text)
End Sub Private Sub Text3_Change()
    Number_of_hits = Val(Text3.Text)
End Sub Private Sub Text4_Change()
    Allowed_misses = Val(Text4.Text)
End Sub
```

APPENDIX A

```
Form1 - 8

Private Sub Text5_Change()
    Slope_error = Val(Text5.Text)
End Sub

Private Sub Text6_Change()
    Target_slope = Val(Text6.Text)
End Sub

Private Sub Text7_Change()
    Rate = Val(Text7.Text)
End Sub

Private Sub Text8_Change()
    Bound = Val(Text8.Text)
End Sub

Private Sub Text9_Change()
    Sim_quantity = Val(Text9.Text)
End Sub
```

Form2 - 1                                APPENDIX A

```
Private Sub Command1_Click()
    Random_sim = Check1.Value
    File_count = 0
    For I = 0 To File1.ListCount - 1
        If File1.Selected(I) Then
            File_count = File_count + 1
            File_name(File_count) = File1.Path + "\" + File1.List(I)
        End If
    Next I
    Form1.Show
    Unload Form2
End Sub Private Sub Command2_Click()
    File_count = 0
    Form1.Show
    Unload Form2
End Sub Private Sub Dir1_Change()
    File1.Path = Dir1.Path
    File_path$ = Dir1.Path
    File1.Refresh
    Drivechange = 0
End Sub Private Sub Drive1_Change()
    On Error GoTo ErrorHandler
    Current_drive = Left$(Dir1, 3)
    Requested_drive = Drive1
    Dir1.Path = Requested_drive
    Dir1.Refresh
    File1.Path = Dir1.Path
    File_path$ = Dir1.Path
    File1.Refresh
    GoTo Finish No_change:
    Drive1.Drive = Current_drive Finish:
    Dir1.Path = File_path$
Exit Sub ErrorHandler:
    Select Case Err
        Case 68: Msg = "ERROR 68: Drive " & Requested_drive & " not available."
        Case Else: Msg = "ERROR " & Err & " occurred."
    End Select
    MsgBox Msg
    Resume No_change End Sub Private Sub File1_Click()
    Command1.Enabled = True
End Sub Private Sub File1_DblClick()
    Command1_Click
End Sub Private Sub Form_Activate()
    Command1.Enabled = False
```

APPENDIX A

```
Form2 - 2
    If File path$ <> "" Then
        Dir1.Path = File path$
        File1.Path = Dir1.Path
        File1.Refresh
    End If
End Sub
```

I claim:

1. A method of recharging a secondary battery to a substantially full-charge state and preventing overcharge by predicting an optimal charging time from the battery's voltage response during charging, said method comprising the following steps:

(a) developing standard reference data of a first-order time derivative of a standard voltage response of said battery during charging, wherein said reference data comprise a local maximum corresponding to an inflection point in said standard voltage response;

(b) monitoring an actual voltage response of said battery during a charging operation;

(c) computing an actual first-order time derivative of said actual voltage response during the charging operation;

(d) identifying an on-track condition during the charging operation when said computed time derivative substantially matches said standard reference data;

(e) based on the standard reference data, estimating a time period required to reach said local maximum from said on-track condition; and (f) terminating the charging operation after said time period has elapsed after said on-track condition has been reached.

2. The method of claim 1, wherein said standard reference data are developed from a composite function consisting of an exponential equation and a sinc equation fitted with first-order time derivative data from a standard voltage response of said battery during a charging operation.

3. The method of claim 1, wherein said step of monitoring an actual voltage response of said battery during a charging operation is carried out by sampling a terminal voltage of the battery at successive time intervals.

4. The method of claim 3, wherein said successive time intervals are equal.

5. The method of claim 1, wherein said step of computing an actual first-order time derivative of said actual voltage response during the charging operation is carried out by computing a difference between consecutive actual voltage response values.

6. The method of claim 5, wherein each of said actual voltage response values consists of an average of multiple consecutively-sampled voltages.

7. The method of claim 4, wherein said step of computing an actual first-order time derivative of said actual voltage response during the charging operation is carried out by computing a difference between consecutive actual voltage response values.

8. The method of claim 7, wherein each of said actual voltage response values consists of an average of multiple consecutively-sampled voltages.

9. The method of claim 1, wherein said step of identifying an on-track condition during the charging operation when said computed time derivative substantially matches said standard reference data is carried out by comparing a sequence of consecutive values of said computed time derivatives with any sequence of successive values of said standard reference data.

10. The method of claim 4, further comprising the step, prior to step (d), of adjusting a length of said time intervals to produce a substantial match between an initial value of said computed time derivative and a target reference value in said standard reference data.

11. Apparatus for recharging a secondary battery to a substantially full-charge state and preventing overcharge by predicting an optimal charging time from the battery's voltage response during charging, comprising the following components:

means for storing standard reference data of a first-order time derivative of a standard voltage response of said battery during charging, wherein said reference data comprise a local maximum corresponding to an inflection point in said standard voltage response;

means for charging said battery;

means for monitoring an actual voltage response of said battery during a charging operation;

means for computing an actual first-order time derivative of said actual voltage response during the charging operation;

means for identifying an on-track condition during the charging operation when said computed time derivative substantially matches said standard reference data;

means for estimating a time period required to reach said local maximum from said on-track condition based on the standard reference data; and means for terminating the charging operation after said time period has elapsed after reaching said on-track condition.

12. The apparatus of claim 11, wherein said standard reference data are developed from a composite function consisting of an exponential equation and a sinc equation fitted with first-order time derivative data from a standard voltage response of said battery during a charging operation.

13. The apparatus of claim 11, wherein said means for monitoring an actual voltage response of said battery during a charging operation comprises means for sampling a terminal voltage of the battery at successive time intervals.

14. The apparatus of claim 13, wherein said successive time intervals are equal.

15. The apparatus of claim 11, wherein said means for computing an actual first-order time derivative of said actual voltage response during the charging operation comprises means for computing a difference between consecutive actual voltage response values.

16. The apparatus of claim 15, wherein each of said actual voltage response values consists of an average of multiple consecutively-sampled voltages.

17. The apparatus of claim 14, wherein said means for computing an actual first-order time derivative of said actual voltage response during the charging operation comprises means for computing a difference between consecutive actual voltage response values.

18. The apparatus of claim 17, wherein each of said actual voltage response values consists of an average of multiple consecutively-sampled voltages.

19. The apparatus of claim 11, wherein said means for identifying an on-track condition during the charging operation when said computed time derivative substantially matches said standard reference data comprises means for comparing a sequence of consecutive values of said computed time derivatives with any sequence of successive values of said standard reference data.

20. The apparatus of claim 14, further comprising means for adjusting a length of said time intervals to produce a substantial match between an initial value of said computed time derivative and a target reference value in said standard reference data.

* * * * *